United States Patent
Jin et al.

(10) Patent No.: US 12,375,983 B2
(45) Date of Patent: Jul. 29, 2025

(54) COMMUNICATION METHOD AND APPARATUS

(71) Applicant: HUAWEI TECHNOLOGIES CO., LTD., Shenzhen (CN)

(72) Inventors: Yinghao Jin, Boulogne Billancourt (FR); Jinping Hao, Shanghai (CN); Wei Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 426 days.

(21) Appl. No.: 17/854,567

(22) Filed: Jun. 30, 2022

(65) Prior Publication Data

US 2022/0338082 A1 Oct. 20, 2022

Related U.S. Application Data

(63) Continuation of application No. PCT/CN2020/141101, filed on Dec. 29, 2020.

(30) Foreign Application Priority Data

Jan. 1, 2020 (CN) .......................... 202010007455.1

(51) Int. Cl.
*H04W 36/00* (2009.01)
*H04W 36/08* (2009.01)
(Continued)

(52) U.S. Cl.
CPC ... *H04W 36/0077* (2013.01); *H04W 36/0072* (2013.01); *H04W 36/08* (2013.01); *H04W 36/22* (2013.01); *H04W 36/14* (2013.01)

(58) Field of Classification Search
CPC ....... H04W 28/26; H04W 4/06; H04W 72/30; H04W 72/23
See application file for complete search history.

(56) References Cited

U.S. PATENT DOCUMENTS

| | | | | |
|---|---|---|---|---|
| 11,811,488 | B2 * | 11/2023 | Edge | ........................ H04W 4/90 |
| 2005/0192011 | A1 * | 9/2005 | Hong | ................ H04W 36/0061 |
| | | | | 455/436 |

(Continued)

FOREIGN PATENT DOCUMENTS

| CN | 107889180 A | 4/2018 |
|---|---|---|
| CN | 108924884 A | 11/2018 |

(Continued)

OTHER PUBLICATIONS

Intel, Supporting Fast Return to 5GS after EPS fallback—TS 23.502. SA WG2 Meeting #126, Feb. 26- Mar. 2, 2018, Montreal, Canada, S2-182066, 6 pages (Year: 2018).*

(Continued)

*Primary Examiner* — Lan-Huong Truong
(74) *Attorney, Agent, or Firm* — HAUPTMAN HAM, LLP

(57) ABSTRACT

A communication method and a related device are disclosed. An evolved NodeB eNB receives a first message sent by a terminal device, where the first message is for requesting to access the eNB. The eNB sends a second message to the terminal device, where the second message includes a system message corresponding to at least one serving cell of a gNB, and the second message indicates the terminal device to be redirected to one of the at least one serving cell of the gNB, or the second message indicates the terminal device to be handed over to one of the at least one serving cell of the gNB. The terminal device receives the system message of the serving cell of the gNB from the eNB, to access the gNB.

16 Claims, 10 Drawing Sheets

(51) Int. Cl.
   *H04W 36/22* (2009.01)
   *H04W 36/14* (2009.01)

(56) References Cited

U.S. PATENT DOCUMENTS

| | | | |
|---|---|---|---|
| 2018/0376384 A1 | 12/2018 | Youn et al. | |
| 2019/0380081 A1* | 12/2019 | Chang | H04W 36/0069 |
| 2021/0168691 A1* | 6/2021 | Lee | H04W 36/328 |
| 2021/0289467 A1* | 9/2021 | Worrall | H04W 72/20 |
| 2022/0217594 A1* | 7/2022 | Kim | H04W 36/185 |
| 2022/0408323 A1* | 12/2022 | Ishii | H04W 36/362 |

FOREIGN PATENT DOCUMENTS

| | | |
|---|---|---|
| CN | 109151948 A | 1/2019 |
| CN | 109155949 A | 1/2019 |
| CN | 109391978 A | 2/2019 |
| CN | 109862595 A | 6/2019 |
| CN | 110140421 A | 8/2019 |
| WO | 2017188787 A2 | 11/2017 |
| WO | 2019097498 A1 | 5/2019 |

OTHER PUBLICATIONS

LG Electronics, Interworking options for supporting or non-supporting NGx. SA WG2 Meeting #118-BIS, Jan. 16-20, 2017 Spokane, WA, USA, S2-170203, 3 pages.
Intel, Supporting Fast Return to 5GS after EPS fallback—TS 23.502. SA WG2 Meeting #126, Feb. 26 Mar.2, 2018, Montreal, Canada, S2-182066, 6 pages.
Extended European Search Report issued in corresponding European Application No. 20909986.0, dated Apr. 28, 2023, pp. 1-11.
Ericsson, Inter and Intra system handover over NG. 3GPP TSG-RAN WG3 Meeting #99, Athens, Grace, Feb. 26-Mar. 2, 2018, R3-181238, 2 pages.
OPPO, Clarification on eNB id is unchanged during HO. SA WG2 Meeting #124, Nov. 27-Dec. 1, 2017, Reno, Nevada, USA, S2-178437, 6 pages.
International Search Report issued in corresponding International Application No. PCT/CN2020/141101, dated Mar. 25, 2021, pp. 1-9.
Chinese Office Action issued in corresponding Chinese Application No. 202010007455.1, dated Nov. 1, 2021, pp. 1-5.

* cited by examiner

COMMUNICATION METHOD AND APPARATUS

CROSS-REFERENCE TO RELATED APPLICATIONS

This application is a continuation of International Application No. PCT/CN2020/141101, filed on Dec. 29, 2020, which claims priority to Chinese Patent Application No. 202010007455.1, filed on Jan. 1, 2020. The disclosures of the aforementioned applications are hereby incorporated by reference in their entireties.

BACKGROUND

In an existing solution, when a terminal device camping on an evolved NodeB (eNB) needs to be handed over to a serving cell of a gNB (Next Generation NodeB), a latency of accessing the gNB by the terminal device is high.

SUMMARY

Embodiments of this application provide a communication method and a related apparatus, to expect a terminal device to quickly access a gNB (Next Generation NodeB).

At least one embodiment provides a communication method. The method includes:

An evolved NodeB eNB receives a first message from a terminal device, where the first message is for requesting to access the eNB.

In response to the first message, the eNB sends a second message to the terminal device, where the second message includes a system message corresponding to at least one serving cell of a gNB, and the second message indicates the terminal device to be redirected to one of the at least one serving cell of the gNB, or the second message indicates the terminal device to be handed over to one of the at least one serving cell of the gNB.

In this example, the system message of the at least one serving cell of the gNB is sent to the terminal device by using the second message. Therefore, the terminal device is redirected to one of the at least one serving cell of the gNB based on the system message, or the terminal device is handed over to one of the at least one serving cell of the gNB based on the system message. The terminal device does not need to access the gNB after a security system is set up, so that the terminal device quickly accesses the gNB. This reduces a latency of accessing the gNB by the terminal device.

In at least one embodiment, the second message further includes a condition for redirecting the terminal device to a cell of the at least one serving cell of the gNB, to indicate the terminal device to perform cell redirection or cell handover under a corresponding condition. A redirection or handover condition includes that the terminal device receives a downlink common control message from a target cell, and strength of a downlink signal of the target cell received by the terminal device is higher than a threshold. The downlink common control message includes an SSB.

In at least one embodiment, the method further includes:

The eNB receives a paging message from the gNB, where the paging message includes a tracking area identifier.

In response to the paging message, the eNB sends the paging message in a tracking area indicated by the tracking area identifier.

In this example, the paging message is sent in the tracking area indicated by the tracking area identifier. Compared with an existing solution in which the paging message is sent in a broadcast manner, this solution reduces a quantity of times of sending the paging message, to reduce system energy consumption.

In at least one embodiment, the method further includes:

The eNB sends a first interface setup request message to the gNB, where the first interface setup request message includes cell information of the eNB.

The eNB receives a first interface setup response message from the gNB, where the first interface setup response message includes broadcast information of the serving cell of the gNB.

In this example, during setup of a first interface, the eNB sends the cell information of the eNB to the gNB, and the gNB sends the broadcast information of the serving cell of the gNB to the eNB. Therefore, the eNB notifies the gNB of the cell information of the eNB, so that the gNB sends the cell information of the eNB to a core network element. The core network element determines a tracking area in the cell information as a registration area of the terminal device, so that the terminal device does not need to trigger a TAU procedure in response to moving between a cell of the gNB and a cell of the eNB. This reduces energy consumption of the terminal device. After receiving the broadcast information of the serving cell of the gNB, the eNB sends the system message of the serving cell to the terminal device in response to the terminal device requesting access, so that a latency of accessing the gNB by the terminal device is reduced.

In at least one embodiment, the method further includes:

The eNB sends a first interface setup request message to the gNB, where the first interface setup request message includes cell information of the eNB.

The eNB receives a first interface setup response message from the gNB.

In at least one embodiment, the method further includes:

The eNB receives a third message from the gNB, where the third message includes the broadcast information of the serving cell of the gNB. The first interface setup response message and the third message are sent in any sequence.

In this example, the broadcast information of the serving cell of the gNB is sent using the third message. Therefore, the broadcast information is sent using the newly constructed third message without changing an existing interface setup solution, so that system reliability is improved.

In at least one embodiment, the cell information includes at least one of the following: a physical cell identifier or a tracking area identifier.

In at least one embodiment, the broadcast information of the serving cell of the gNB includes at least one of the following: a SIB 1 or a SIB 2.

In at least one embodiment, the first message further includes measurement information of the at least one serving cell of the gNB, the system message corresponding to the at least one serving cell of the gNB includes identification information of a target cell and a system message corresponding to the target cell, and the target cell is a serving cell to which the terminal device is handed over.

In this example, the system message includes the identification information of the target cell and the system message corresponding to the target cell, and the target cell is the serving cell to which the terminal device is handed over. Therefore, after receiving the second message, the terminal device performs cell handover based on a target cell in the second message, to hand over to the target cell. There is no need to determine a target cell, so that energy consumption of the terminal device is reduced.

In at least one embodiment, the method further includes: The eNB sends a frequency for redirection to the terminal device, where the frequency is a frequency of the at least one serving cell of the gNB.

In this example, the eNB sends the frequency for redirection to the terminal device, where the frequency is the frequency of the at least one serving cell of the gNB. This improves efficiency of redirecting the terminal device to the at least one serving cell of the gNB.

In at least one embodiment, the eNB sends a notification message to a neighboring gNB in response to the second message not including the system message corresponding to the at least one serving cell of the gNB, where the notification message indicates at least one serving cell of the neighboring gNB to perform Remaining Minimum System Information (RMSI) broadcast.

In this example, in response to the second message not including the system message corresponding to the at least one serving cell of the gNB, the notification message indicates the at least one serving cell of the neighboring gNB to perform RMSI broadcast, so that the terminal device accesses the serving cell of the gNB after obtaining RMSI. This reduces a latency of accessing the gNB by the terminal device.

In at least one embodiment, the method further includes: The eNB sends a fourth message to the terminal device, where the fourth message indicates the terminal device to perform cell reselection. The eNB sends the fourth message in response to a measurement value of a downlink RSRP being higher than a preset threshold.

In this example, in response to determining that the measurement value of the downlink RSRP is higher than the preset threshold, the eNB sends, to the terminal device, the fourth message (for example, a broadcast message), indicating the terminal device to perform cell reselection. This increases a rate at which the terminal device accesses the serving cell of the gNB.

At least one embodiment provides a communication method. The method includes:

A terminal device sends a first message to an eNB, where the first message is for requesting to access the eNB.

The terminal device receives a second message from the eNB, where the second message includes a system message corresponding to at least one serving cell of a gNB, and the second message indicates the terminal device to be redirected to one of the at least one serving cell of the gNB, or the second message indicates the terminal device to be handed over to one of the at least one serving cell of the gNB.

In at least one embodiment, the first message further includes measurement information of the at least one serving cell of the gNB, the system message corresponding to the at least one serving cell of the gNB includes identification information of a target cell and a system message corresponding to the target cell, and the target cell is a serving cell to which the terminal device is handed over.

In at least one embodiment, the method further includes: In response to the second message, the terminal device determines a target cell from the at least one serving cell of the gNB, where the target cell is a serving cell to which the terminal device is handed over.

The terminal device hands over to the target cell based on a system message corresponding to the target cell.

In at least one embodiment, the method further includes: The terminal device receives information about a registration area from a core network element, where the information about the registration area includes a tracking area identifier of the serving cell of the gNB and a tracking area identifier of a serving cell of the eNB.

In this example, in response to the registration area information that being received from the core network element by the terminal device including the tracking area identifier of the serving cell of the gNB and the tracking area identifier of the serving cell of the eNB, the terminal device does not trigger a TAU procedure in response to moving between the serving cell of the gNB and the serving cell of the eNB, so that energy consumption of the terminal device is reduced.

In at least one embodiment, the method further includes: The terminal device receives a fourth message from the eNB.

In response to the fourth message, the terminal device performs cell reselection based on the fourth message.

At least one embodiment provides a communication method. The method includes:

A gNB receives a paging message from a core network element, where the paging message includes a tracking area identifier corresponding to at least one tracking area.

In response to the paging message, the gNB sends the paging message to an eNB based on the tracking area identifier.

In at least one embodiment, the method further includes: The gNB receives a first interface setup request message from the eNB, where the first interface setup request message includes cell information of the eNB.

In response to the first interface setup request message, the gNB sends a first interface setup response message to the eNB, where the first interface setup response message includes broadcast information of a serving cell of the gNB.

In at least one embodiment, the method further includes: The gNB receives a first interface setup request message from the eNB, where the first interface setup request message includes cell information of the eNB.

In response to the first interface setup request message, the gNB sends a first interface setup response message to the eNB.

In at least one embodiment, the method further includes: In response to the first interface setup request message, the gNB sends a third message to the eNB, where the third message includes the broadcast information of the serving cell of the gNB.

In at least one embodiment, the cell information includes at least one of the following: information about a physical cell identifier or information about the tracking area identifier.

In at least one embodiment, the broadcast information of the serving cell of the gNB includes at least one of the following: a SIB 1 or a SIB 2.

In at least one embodiment, the method further includes: The gNB sends a second interface setup request message to the core network element, where the second interface setup request message includes cell information of the gNB and the cell information of the eNB.

The gNB receives a second interface setup response message from the core network element.

In this example, the gNB sends the second interface setup request message to the core network element, and the second interface setup request message includes the cell information of the gNB and the cell information of the eNB, so that the core network element determines registration area information of a terminal device based on the cell information of the gNB and the cell information of the eNB. In this way, the terminal device does not trigger a TAU procedure in response to moving between the serving cell of the gNB and the serving cell of the eNB, so that energy consumption of the terminal device is reduced.

At least one embodiment provides a communication method. The method includes:

A core network element determines a registration area of a terminal device, where the registration area includes at least one tracking area identifier.

The core network element sends a paging message to a gNB, where the paging message includes a tracking area identifier corresponding to at least one tracking area.

In at least one embodiment, the method further includes:

The core network element receives a second interface setup request message from the gNB, where the second interface setup request message includes cell information of the gNB and cell information of an eNB.

In response to the second interface setup request message, the core network element sends a second interface setup response message to the gNB.

In at least one embodiment, the cell information includes at least one of the following: information about a physical cell identifier or information about the tracking area identifier.

In at least one embodiment, the method further includes:

The core network element sends information about the registration area to the terminal device, where the information about the registration area includes the tracking area identifier corresponding to the at least one tracking area, and the tracking area identifier corresponding to the at least one tracking area includes a tracking area identifier of a serving cell of the gNB and a tracking area identifier of a serving cell of the eNB.

At least one embodiment provides a network device. The device includes:

a receiving module, configured to receive a first message from a terminal device, where the first message is for requesting to access the network device; and a sending module, configured to send a second message to the terminal device, where the second message includes a system message corresponding to at least one serving cell of a gNB, and the second message indicates the terminal device to be redirected to one of the at least one serving cell of the gNB, or the second message indicates the terminal device to be handed over to one of the at least one serving cell of the gNB.

In at least one embodiment, the second message further includes a condition for redirecting the terminal device to a cell of the at least one serving cell of the gNB, to indicate the terminal device to perform cell redirection or cell handover under a corresponding condition. A redirection or handover condition includes that the terminal device receives a downlink common control message from a target cell, and strength of a downlink signal of the target cell received by the terminal device is higher than a threshold. The downlink common control message includes an SSB.

In at least one embodiment the receiving module is configured to receive a paging message from the gNB, where the paging message includes a tracking area identifier; and the sending module is configured to send the paging message in a tracking area indicated by the tracking area identifier.

In at least one embodiment,
the sending module is configured to send a first interface setup request message to the gNB, where the first interface setup request message includes cell information of the network device; and the receiving module is configured to receive a first interface setup response message from the gNB, where the first interface setup response message includes broadcast information of the serving cell of the gNB.

In at least one embodiment,
the sending module is configured to send a first interface setup request message to the gNB, where the first interface setup request message includes cell information of the network device; and the receiving module is configured to receive a first interface setup response message from the gNB.

In at least one embodiment,
the receiving module is configured to receive a third message from the gNB, where the third message includes the broadcast information of the serving cell of the gNB.

In at least one embodiment, the cell information includes at least one of the following: a physical cell identifier or the tracking area identifier.

In at least one embodiment, the broadcast information of the serving cell of the gNB includes at least one of the following: a SIB 1 or a SIB 2.

In at least one embodiment, the first message further includes measurement information of the at least one serving cell of the gNB, the system message corresponding to the at least one serving cell of the gNB includes identification information of a target cell and a system message corresponding to the target cell, and the target cell is a serving cell to which the terminal device is handed over.

In at least one embodiment, the sending module is configured to send a frequency for redirection to the terminal device, where the frequency is a frequency of the at least one serving cell of the gNB.

In at least one embodiment, the sending module is configured to send a notification message to a neighboring gNB in response to the second message not including the system message corresponding to the at least one serving cell of the gNB, where the notification message indicates at least one serving cell of the neighboring gNB to perform RMSI broadcast.

In at least one embodiment the sending module is configured to send a fourth message to the terminal device, where the fourth message indicates the terminal device to perform cell reselection.

At least one embodiment provides a communication apparatus. The communication apparatus includes a processor, a memory, and a transceiver. The memory stores instructions or a program. The processor is configured to execute the instructions or the program stored in the memory. In response to the instructions or the program stored in the memory being executed, the transceiver is configured to perform the operation performed by the receiving module or the sending module in the fifth aspect.

At least one embodiment provides a terminal device. The device includes:

a sending module, configured to send a first message to an eNB, where the first message is for requesting to access the eNB; and a receiving module, configured to receive a second message from the eNB, where the second message includes a system message corresponding to at least one serving cell of a gNB, and the second message indicates the terminal device to be redirected to one of the at least one serving cell of the gNB, or the second message indicates the terminal device to be handed over to one of the at least one serving cell of the gNB.

In at least one embodiment, the first message further includes measurement information of the at least one serving cell of the gNB, the system message corresponding to the at least one serving cell of the gNB includes identification information of a target cell and a system message corresponding to the target cell, and the target cell is a cell to which the terminal device is to be handed over.

In at least one embodiment, the device further includes a processing module, where the processing module is configured to determine a target cell from the at least one serving cell of the gNB, where the target cell is a serving cell to which the terminal device is handed over; and the processing module is configured to hand over the terminal device to the target cell based on a system message corresponding to the target cell.

In at least one embodiment, the receiving module is configured to receive information about a registration area from a core network element, where the information about the registration area includes a tracking area identifier of the serving cell of the gNB and a tracking area identifier of a serving cell of the eNB.

In at least one embodiment, the receiving module is configured to receive a fourth message from the eNB; and the processing module is configured to perform cell reselection based on the fourth message.

At least one embodiment provides a communication apparatus. The communication apparatus includes a processor, a memory, and a transceiver. The memory stores instructions or a program. The processor is configured to execute the instructions or the program stored in the memory. In response to the instructions or the program stored in the memory being executed, the processor is configured to perform the operation performed by the processing module in the seventh aspect, and the transceiver is configured to perform the operation performed by the receiving module or the sending module in the seventh aspect.

At least one embodiment provides a network device. The device includes:

a receiving module, configured to receive a paging message from a core network element, where the paging message includes a tracking area identifier corresponding to at least one tracking area; and a sending module, configured to send the paging message to an eNB based on the tracking area identifier.

In at least one embodiment, the receiving module is configured to receive a first interface setup request message from the eNB, where the first interface setup request message includes cell information of the eNB; and the sending module is configured to send a first interface setup response message to the eNB, where the first interface setup response message includes broadcast information of a serving cell of the network device.

In at least one embodiment, the receiving module is configured to receive a first interface setup request message from the eNB, where the first interface setup request message includes cell information of the eNB; and the sending module is configured to send a first interface setup response message to the eNB.

In at least one embodiment, the sending module is configured to send a third message to the eNB, where the third message includes the broadcast information of the serving cell of the network device.

In at least one embodiment, the cell information includes at least one of the following: information about a physical cell identifier or information about the tracking area identifier.

In at least one embodiment, the broadcast information of the serving cell of the network device includes at least one of the following: a SIB 1 or a SIB 2.

In at least one embodiment, the sending module is configured to send a second interface setup request message to the core network element, where the second interface setup request message includes cell information of the network device and the cell information of the eNB; and the receiving module is configured to receive a second interface setup response message from the core network element.

At least one embodiment provides a communication apparatus. The communication apparatus includes a processor, a memory, and a transceiver. The memory stores instructions or a program. The processor is configured to execute the instructions or the program stored in the memory. In response to the instructions or the program stored in the memory being executed, the transceiver is configured to perform the operation performed by the receiving module or the sending module in the ninth aspect.

At least one embodiment provides a network device. The device includes:

a processing module, configured to determine a registration area of a terminal device, where the registration area includes at least one tracking area; and a transceiver module, configured to send a paging message to a gNB, where the paging message includes a tracking area identifier corresponding to the at least one tracking area.

In at least one embodiment, the transceiver module is configured to receive a second interface setup request message from the gNB, where the second interface setup request message includes cell information of the gNB and cell information of an eNB; and the transceiver module is configured to send a second interface setup response message to the gNB.

In at least one embodiment, the cell information includes at least one of the following: information about a physical cell identifier or information about the tracking area identifier.

In at least one embodiment, the transceiver module is configured to send information about the registration area to the terminal device, where the information about the registration area includes the tracking area identifier corresponding to the at least one tracking area, and the tracking area identifier corresponding to the at least one tracking area includes a tracking area identifier of a serving cell of the gNB and a tracking area identifier of a serving cell of the eNB.

At least one embodiment provides a communication apparatus. The communication apparatus includes a processor, a memory, and a transceiver. The memory stores instructions or a program. The processor is configured to execute the instructions or the program stored in the memory. In response to the instructions or the program stored in the memory being executed, the processor is configured to perform the operation performed by the processing module in the eleventh aspect, and the transceiver is configured to perform the operation performed by the transceiver module in the eleventh aspect.

At least one embodiment provides a communication system. The communication system includes the network device in the fifth aspect, the terminal device in the seventh aspect, the network device in the ninth aspect, and the network device in the eleventh aspect.

At least one embodiment provides a chip system. The chip system includes a processor, configured to support a network device in implementing the method according to the first aspect and the methods according to the third aspect and the fourth aspect.

At least one embodiment provides a chip system. The chip system includes a processor, configured to support a terminal device in implementing the method according to the second aspect.

At least one embodiment provides a computer-readable storage medium. The computer-readable storage medium stores a computer program, the computer program includes program instructions, and in response to the program instructions being executed by a processor, the processor is enabled to perform the methods according to the first to fourth aspects.

Embodiments are clearer and more comprehensible in descriptions of the following embodiments.

BRIEF DESCRIPTION OF DRAWINGS

To describe the technical solutions in embodiments, the accompanying drawings are used. It is clear that the accompanying drawings in the following descriptions show some embodiments of this application, and a person of ordinary skill in the art derives other drawings from these accompanying drawings without creative efforts.

DESCRIPTION OF EMBODIMENTS

Figure 1A:
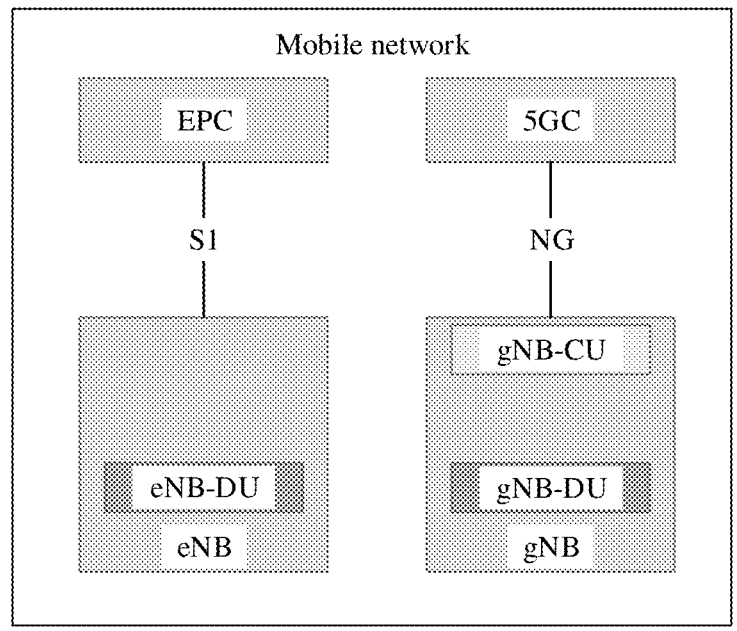
FIG. 1A is a schematic diagram of a mobile network according to at least one embodiment.

The following describes embodiments of this application with reference to the accompanying drawings.

The technical solutions in embodiments are applied to a system in which a long term evolution (Long Term Evolution, LTE) architecture and a 5G communication system coexist.

At least one embodiment relates to a terminal device. The terminal device includes a device that provides a user with voice and/or data connectivity, for example, includes a handheld device with a wireless connection function, or a processing device connected to a wireless modem. The terminal device communicates with a core network through a radio access network (radio access network, RAN), and exchange a voice and/or data with the RAN. The terminal device includes user equipment (user equipment, UE), a wireless terminal device, a mobile terminal device, a device-to-device (device-to-device, D2D) communication terminal device, a vehicle-to-everything (vehicle-to-everything, V2X) terminal device, a machine-to-machine/machine-type communication (machine-to-machine/machine-type communication, M2M/MTC) terminal device, an Internet of things (Internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device includes a mobile phone (or referred to as a "cellular" phone), a computer with a mobile terminal device, or a portable, pocket-sized, handheld, or computer built-in mobile apparatus. For example, the terminal device is a device such as a personal communications service (personal communications service, PCS) phone, a cordless phone, a session initiation protocol (session initiation protocol, SIP) phone, a wireless local loop (wireless local loop, WLL) station, or a personal digital assistant (personal digital assistant, PDA). The terminal device further includes a limited device, for example, a device having low power consumption, a device having a limited storage capability, or a device having a limited computing capability. For example, the terminal device includes an information sensing device such as a barcode, radio frequency identification (radio frequency identification, RFID), a sensor, a global positioning system (global positioning system, GPS), or a laser scanner. This is not limited in embodiments of this application.

By way of example but not limitation, in embodiments of this application, the terminal device alternatively is a wearable device. The wearable device also is referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is more than a hardware device, and implements powerful functions through software support, data exchange, and cloud interaction. In a broad sense, the wearable intelligent device includes full-featured and large-sized devices that implements functions without depending on smartphones, for example, smart watches or smart glasses, and devices that focus on one type of application function and need to work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices is considered as vehicle-mounted terminal devices. For example, the vehicle-mounted terminal device is also referred to as an on-board unit (on-board unit, OBU).

Embodiments of this application further relate to a network device. The network device is a device configured to communicate with the terminal device, for example, is an evolved NodeB (Evolved NodeB, eNB or eNodeB) in an LTE system. Alternatively, the network device is a relay station, an access point, a vehicle-mounted device, a wearable device, a network side device in a 5G network or a post-5G network, a network device in a future evolved PLMN network, or the like.

The network device in embodiments of this application includes a radio access network (Radio Access Network, RAN) device and a core network device. The RAN device is connected to the terminal device, and is configured to receive data from the terminal device and send the data to the core network device. The RAN device corresponds to different devices in different communication systems. For example, the RAN device corresponds to an evolved NodeB (Evolved NodeB, eNB) in a 4G system, and corresponds to a 5G system, for example, an access network device (for example, a gNB (Next Generation NodeB), a centralized unit (CU), or a distributed unit (DU)) in a new radio (New Radio, NR) access system. The core network device includes an access and mobility management function (access and mobility management function, AMF) network element, which belongs to a core network element and is mainly responsible for signaling processing such as access control, mobility management, attachment, detachment, and gateway selection.

In embodiments of this application, "at least one" means one or more, and "a plurality of" means two or more. The term "and/or" describes an association relationship for describing associated objects and represents that three relationships exists. For example, A and/or B represents the following cases: Only A exists, both A and B exist, and only B exists, where A and B is singular or plural. The character "/" usually indicates an "or" relationship between the associated objects. "At least one item (piece) of" the following" or a similar expression thereof means any combination of the items, including any combination of singular items (pieces) or plural items (pieces). For example, at least one of a, b, or c may indicate: a, b, c, a and b, a and c, b and c, or a, b, and c, where a, b, and c is singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, first information and second information are merely intended to distinguish between different information, but do not indicate that the two types of information are different in content, priorities, sending sequences, importance, or the like.

The foregoing describes some concepts in embodiments of this application. The following describes technical features in embodiments of this application.

Figure 1B:
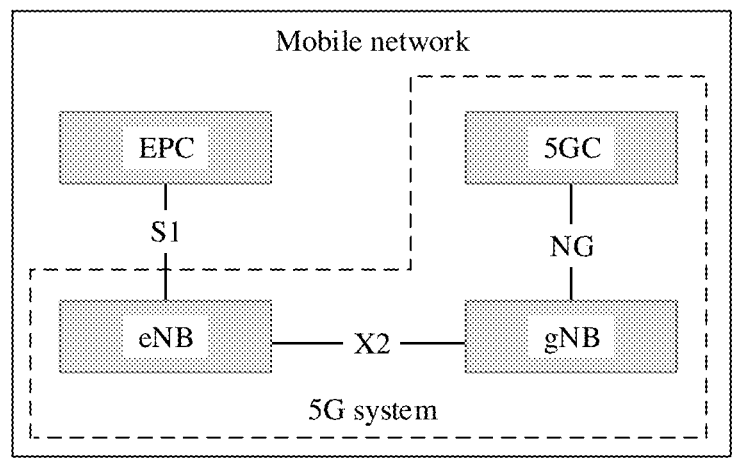
FIG. 1B is a schematic diagram of another mobile network according to at least one embodiment.

FIG. 1A and FIG. 1B are schematic diagrams of mobile networks in this application. As shown in FIG. 1A, the mobile network includes a 4G network and a 5G network. The 4G network and the 5G network are independent networks. The 4G system includes a 4G core network (EPC) and an eNB. The eNB is connected to the EPC through an interface S1. The eNB is an independent network element, and includes one centralized unit CU and one or more distributed units (DUs). The 5G system includes a 5G core network (5GC) and a gNB. The gNB is connected to the 5GC through an interface NG. The gNB is an independent network element, or uses a CU-DU separated base station architecture. The gNB includes one centralized unit (CU) and one or more distributed units (DUs). One CU includes one centralized unit-control plane (CU-CP) and one or more centralized unit-user planes (CU-UPs), and functions of the CU and the DU is divided based on a protocol stack.

As shown in FIG. 1B, the mobile network includes a 4G network and a 5G network. The 4G system includes a 4G core network (EPC) and an eNB. The 5G system includes a 5G core network (5GC), the eNB, and a gNB. The eNB communicates with the gNB through a newly added interface. The newly added interface is referred to as an X2 interface, or is another interface. The newly added interface implements interworking between the eNB and the gNB.

In the current mobile network, after a terminal device accesses the 5G network, in response to sending a paging message to the terminal device, a core network element connected to the gNB sends the paging message in a serving cell of the eNB in the 4G network and a serving cell of the gNB in the 5G network. Therefore, the paging message is sent in the serving cell of the eNB and the serving cell of the gNB. In this way, the paging message is sent in a cell outside a tracking area of the terminal device. Inevitably, the terminal device cannot be paged in response to the paging message being sent in the cell outside the tracking area, resulting in unnecessary energy consumption in the mobile network and high energy consumption in the mobile network.

Figure 1C:
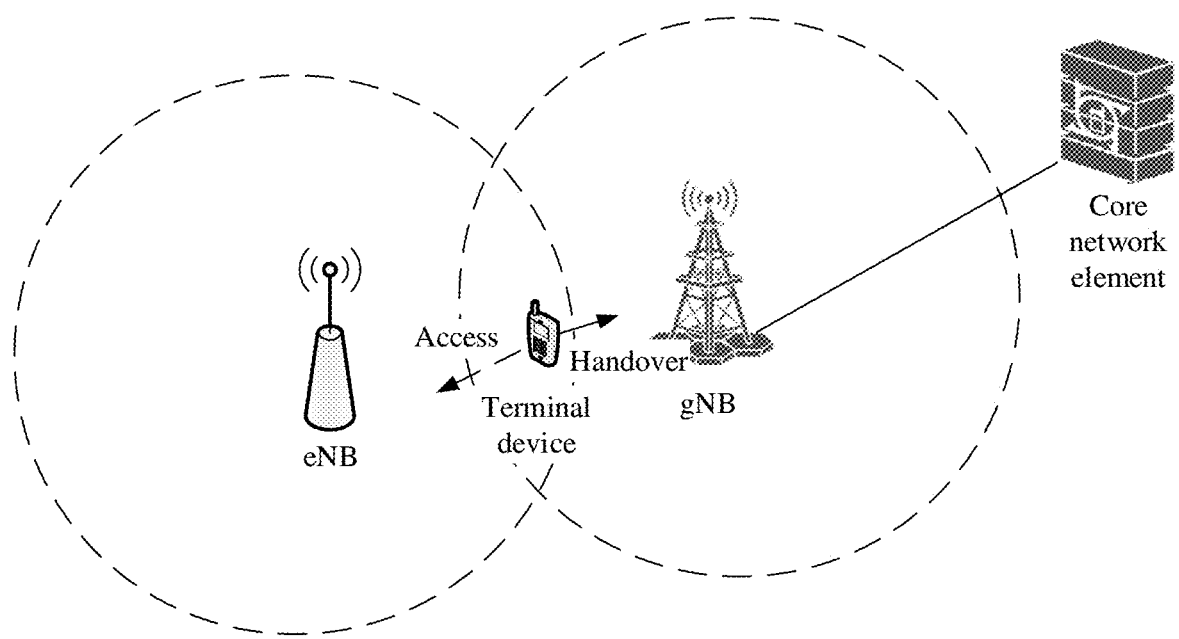
FIG. 1C is a schematic diagram of a communication system according to at least one embodiment.

FIG. 1C is a schematic diagram of a communication system according to at least one embodiment. As shown in FIG. 1C, the communication system includes an eNB, a gNB, a core network element, and a terminal device. An LTE network in which the eNB is located and a 5G network in which the gNB is located are independent network systems, and the core network element is a core network element connected to the gNB.

When the terminal device does not camp on a serving cell of the gNB, the terminal device requests to access the eNB. The eNB rejects access of the terminal based on a location of the terminal device, a network resource usage status, and the like. The eNB redirects the terminal device to the serving cell of the gNB, or hands over the terminal device to the serving cell of the gNB. The eNB sends the terminal device a system message corresponding to at least one serving cell of the gNB. After receiving the system message, the terminal device is redirected to one of the at least one serving cell of the gNB, or is handed over to one of the at least one serving cell of the gNB. The system message corresponding to the at least one serving cell of the gNB is sent to the terminal device, and the terminal device does not perform a security activation procedure between the terminal device and the eNB, but performs a procedure of accessing the gNB, so that the terminal device accesses the gNB.

When sending a paging message, the core network element sends the paging message to the gNB, where the paging message includes a tracking area identifier, and the tracking area identifier is an identifier corresponding to at least one tracking area in a registration area of the terminal device. In this case, because the gNB does not broadcast a common control channel, the terminal camps only on a 4G network in which the eNB is located. Therefore, the gNB determines that the tracking area identifier includes a tracking area identifier of the eNB, and pages the terminal device in a tracking cell corresponding to the tracking area identifier. Because paging is not performed at the gNB, the gNB does not need to send the common control channel. This reduces energy consumption of the gNB.

Figure 2:
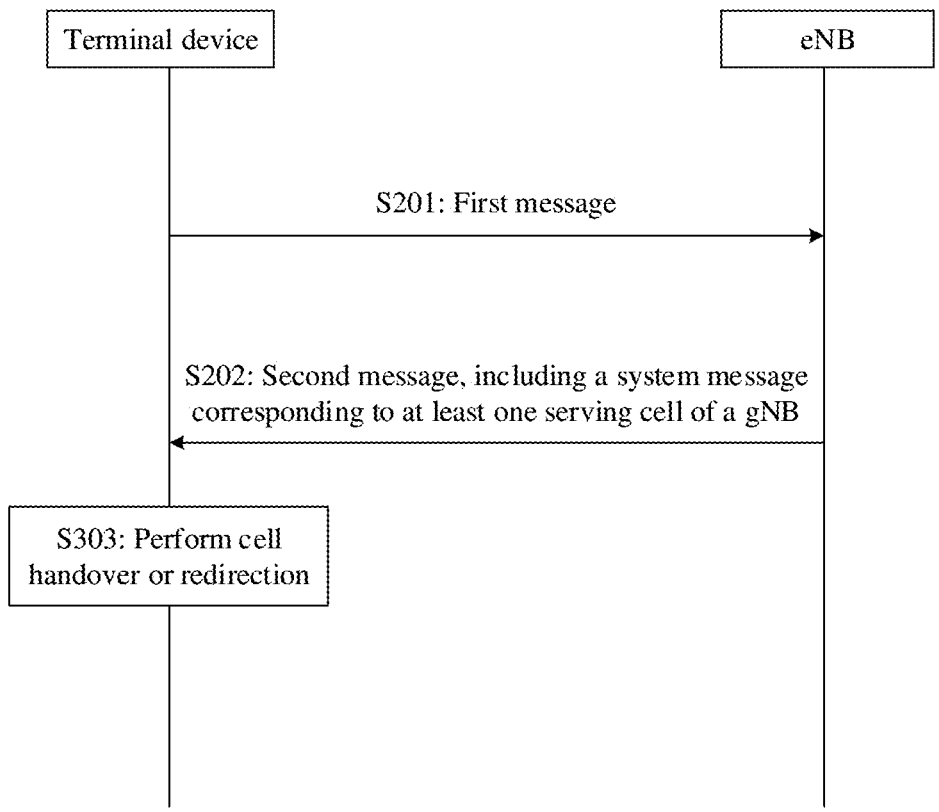
FIG. 2 is a schematic interaction diagram of a communication method according to at least one embodiment.

FIG. 2 is a schematic interaction diagram of a communication method according to at least one embodiment. As shown in FIG. 2, the method is applied to the mobile network shown in FIG. 1A, and the communication method includes the following steps.

S201: A terminal device sends a first message to an eNB, where the first message is for requesting to access the eNB.

The first message is an RRC connection setup complete message, or is an RRC setup request message, or certainly is another message. This is not specifically limited herein.

Optionally, the first message further includes measurement information of at least one serving cell of a gNB, and the measurement information includes a reference signal received power (Reference Signal Received Power, RSRP) of a radio channel and the like.

Optionally, the first message further includes identification information of the at least one serving cell of the gNB. A channel condition between the at least one serving cell and the terminal device meets an access condition of the terminal device. To be specific, the terminal device determines, based on a measured RSRP, that the terminal device accesses the at least one serving cell. The identification information of the at least one serving cell is sorted in a preset sorting order, for example, sorted based on RSRP values measured by the terminal. An RSRP between the terminal device and a serving cell corresponding to identification information with a higher ranking is greater than an RSRP between the terminal and a serving cell corresponding to identification information with a lower ranking, that is, the RSRPs are sorted in descending order. Certainly, the RSRPs alternatively is sorted in ascending order. In at least one embodiment, the identification information includes a total of n pieces of identification information: identification information 1, identification information 2, . . . , and identification information n, which are specifically arranged in descending order as: the identification information n, identification information n−1, . . . , the identification information 2, and the identification information 1. RSRPs between the terminal device and serving cells corresponding to the identification information n, the identification information n−1, . . . , the identification information 2, and the identification information 1 decrease sequentially.

S202: The eNB sends a second message to the terminal device, where the second message includes a system message corresponding to the at least one serving cell of the gNB.

In response to the first message, the eNB sends the second message to the terminal device after the eNB rejects access of the terminal device based on a location of the terminal device, a network resource usage status, and the like.

The second message includes an RRC connection reconfiguration message, a handover command message, an RRC rejection message, an RRC redirection message, and an RRC release message. Certainly, the second message alternatively is another message. This is not specifically limited herein.

The second message indicates the terminal device to be redirected to one cell of the at least one serving cell of the gNB, or the second message indicates the terminal device to be handed over to one of the at least one serving cell of the gNB.

The at least one serving cell of the gNB includes one or more serving cells. In response to the second message includes system messages corresponding to a plurality of serving cells of the gNB, the second message further includes a condition for redirecting the terminal device to one cell of the plurality of serving cells of the gNB or a condition for handing over the terminal device to one cell of the plurality of serving cells of the gNB, to indicate the terminal device to perform cell redirection or cell handover under a corresponding condition. The condition for redirecting the terminal device to one cell of the plurality of serving cells of the gNB or the condition for handing over the terminal device to one cell of the plurality of serving cells of the gNB is that the terminal device receives a downlink common control message from a target cell, for example, an synchronization signal block (Synchronization Signal Block, SSB), and strength of a downlink signal of the target cell received by the terminal is higher than a threshold.

When the first message includes the measurement information of the at least one serving cell of the gNB, the system message of the at least one serving cell of the gNB includes identification information of the target cell and a system message corresponding to the target cell, and the target cell is a serving cell to which the terminal device is handed over.

If the first message includes the identification information of the at least one serving cell of the gNB, and the identification information is sorted in a preset sorting order, the system messages also is sorted in a manner corresponding to the order. After being sorted, the system messages are in one-to-one correspondence with the identification information in terms of rankings, and then are transmitted. In this case, the system messages does not carry the identification information of the cell.

If the first message does not carry any handover-related information, for example, the identification information or the measurement information of the serving cell of the gNB, the eNB determines, based on signal quality of a cell of the eNB, a target cell to which the terminal device needs to be redirected or handed over, and the second message includes identification information of the target cell and a system message of the target cell.

The identification information of the cell is a physical cell identifier, a tracking area identifier, or the like.

Optionally, in response to the eNB sends the second message to the terminal device, AS security between a network side and the terminal device is not activated.

S203: The terminal device performs cell handover or redirection.

After receiving the second message, in response to the second message, the terminal device performs cell handover or redirection.

When the terminal device performs cell handover or redirection, in response to the second message including the identification information of the target cell and the system message corresponding to the target cell, the terminal device is handed over to the target cell.

If the second message includes the system message of the at least one serving cell of the gNB, the terminal device determines a target cell from the at least one serving cell of the gNB, where the target cell is a serving cell to which the terminal device is handed over. The terminal device is handed over to the target cell based on a system message corresponding to the target cell.

A method for determining the target cell from the at least one serving cell of the gNB by the terminal device is: determining the target cell based on the measurement information of the at least one serving cell of the gNB, for example, determining a cell with best measurement information as the target cell.

In this example, after receiving the system message of the at least one serving cell of the gNB, the terminal device is redirected to the at least one serving cell of the gNB, or is handed over to the at least one serving cell of the gNB. The terminal device does not perform a security activation procedure between the terminal device and the eNB, but performs a procedure of accessing the gNB, so that the terminal device accesses the gNB.

In at least one embodiment, the eNB sends a frequency for redirection to the terminal device, where the frequency is a frequency of the at least one serving cell of the gNB, and indicates the terminal device to be redirected to one of the at least one serving cell of the gNB based on the frequency for redirection.

In at least one embodiment, the eNB sends a fourth message to the terminal device, where the fourth message indicates the terminal device to perform cell reselection. The fourth message is a broadcast message.

In at least one embodiment, in response to the second message does not include the system message corresponding to the at least one serving cell of the gNB, the eNB sends a notification message to a neighboring gNB, where the notification message indicates at least one serving cell of the neighboring gNB to broadcast remaining minimum system information (Remaining minimum system information, RMSI).

The serving cell of the neighboring gNB is obtained through historical experience, or is obtained through configuration of operation, administration and maintenance OAM. For example, the OAM determines, through configuration (or a serving cell of the eNB determines, based on historical information of the serving cell of the eNB), that a serving cell of an eNB corresponds to one or more serving cells of the gNB. In response to a 5G user is to access the eNB, the eNB notifies the serving cell that is of the gNB and that corresponds to the serving cell of the eNB to broadcast the RMSI, so that the UE reselects the serving cell of the gNB, and obtain the RMSI from the reselected serving cell of gNB for access. The notification message is an RRC rejection message, an RRC release message, or another RRC message.

Figure 3:
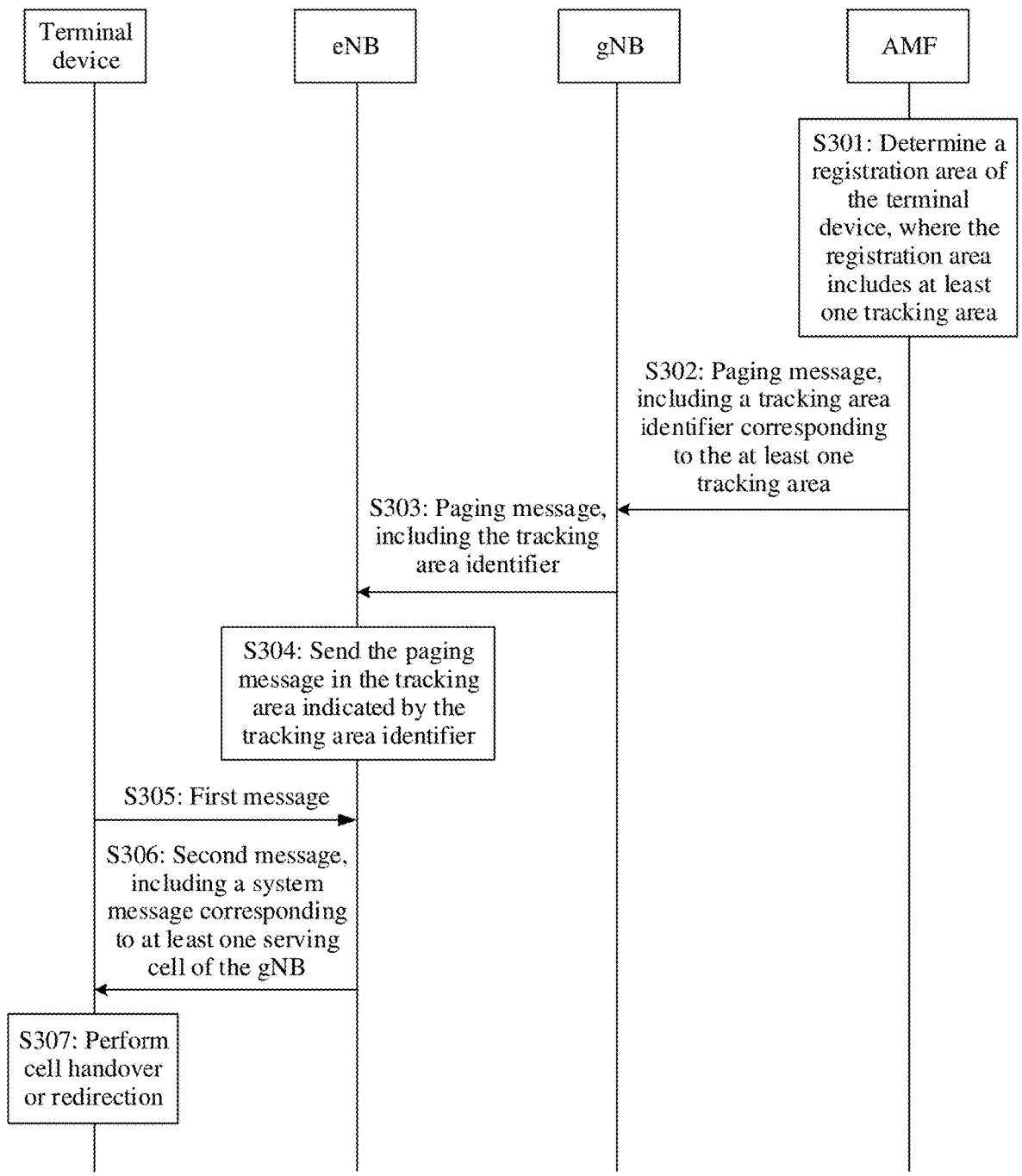
FIG. 3 is a schematic interaction diagram of another communication method according to at least one embodiment.

FIG. 3 is a schematic interaction diagram of another communication method according to at least one embodiment. In this example, an authentication management function AMF network element connected to a gNB is used as an example of a core network element for description. The method is applied to the mobile network shown in FIG. 1A. As shown in FIG. 3, the communication method includes the following steps.

S301: The AMF determines a registration area of a terminal device, where the registration area includes at least one tracking area.

The at least one tracking area includes a tracking area of a serving cell of an eNB and/or a tracking area of a serving cell of the gNB. For example, the at least one tracking area is one or more of the tracking area of the serving cell of the eNB and the tracking area of the serving cell of the gNB.

When the AMF determines the registration area, in at least one embodiment, the AMF determines the registration area of the terminal device based on a location at which the terminal device is in a connected state last time, or further determines the registration area of the terminal device based on a moving speed of the terminal device, or determines the registration area of the terminal device based on historical moving information of the terminal device. In response to the terminal device performing registration, the AMF sends the registration area to the terminal device through a registration procedure, and then store a tracking area identifier.

Alternatively, the AMF determines cell identification information corresponding to the terminal device. For a method for determining the cell identification information by the AMF, refer to the foregoing method for determining the information about the tracking area identifier. Details are not described herein again.

After determining the tracking area identifier, the AMF constructs a paging message, where the paging message includes a tracking area identifier corresponding to the at least one tracking area.

S302: The AMF sends the paging message to the gNB, where the paging message includes the tracking area identifier corresponding to the at least one tracking area.

The tracking area identifier corresponding to the at least one tracking area includes a tracking area identifier of the serving cell of the eNB or a tracking area identifier of the serving cell of the gNB.

The paging message further includes the cell identification information. The tracking area identifier and the cell identification information indicate to send the paging message in the tracking area indicated by the tracking area identifier and in a cell indicated by the cell identification information.

S303: The gNB sends the paging message to the eNB based on the tracking area identifier.

After receiving the paging message sent by the AMF, the gNB obtains, based on the tracking area identifier, the eNB to which the paging message needs to be sent, and then sends the paging message to the eNB. The paging message includes the tracking area identifier of the eNB.

S304: The eNB sends the paging message in the tracking area indicated by the tracking area identifier.

After receiving the paging message sent by the gNB, the eNB obtains the tracking area identifier in the paging message, and the eNB sends the paging message in the tracking area indicated by the tracking area identifier.

S305: The terminal device sends a first message to the eNB, where the first message is for requesting to access the eNB.

S306: The eNB sends a second message to the terminal device, where the second message includes a system message corresponding to at least one serving cell of the gNB.

S307: The terminal device performs cell handover or redirection.

In at least one embodiment, for steps S305 to S307, refer to steps S201 to S203. Details are not described herein again. There is no execution sequence between steps S305 to S307 and steps S301 to S304. To be specific, steps S305 to S307 is performed before steps S301 to S304, or steps S305 to S307 is performed after steps S301 to S304.

In this example, in response to a paging message being sent, a tracking area in which the paging message needs to be sent is determined, and the paging message is sent in the tracking area. Compared with an existing solution in which the paging message is sent in a broadcast manner, this solution reduces a quantity of times of sending the paging message, to reduce system energy consumption.

Figure 4:
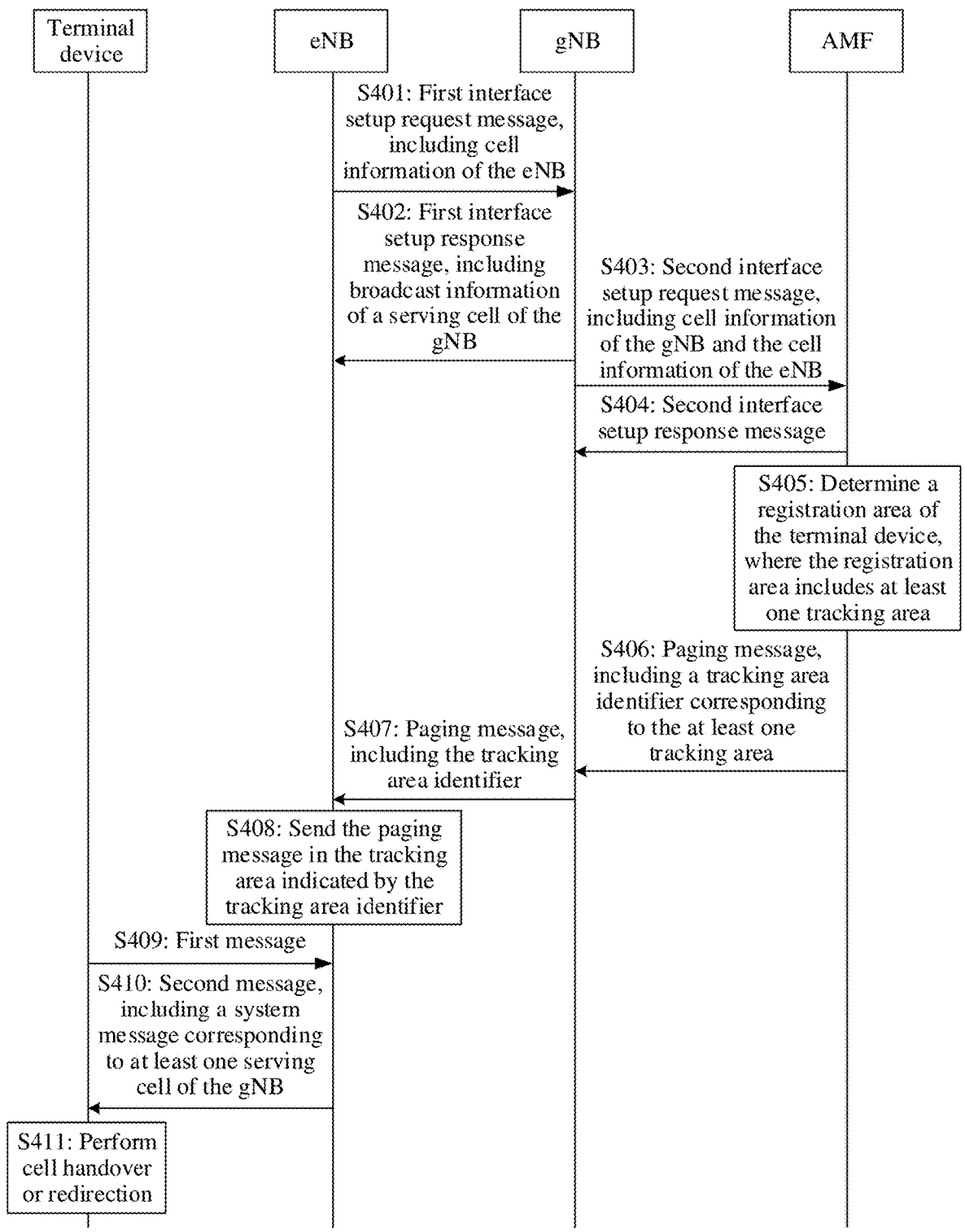
FIG. 4 is a schematic interaction diagram of another communication method according to at least one embodiment.

FIG. 4 is a schematic interaction diagram of another communication method according to at least one embodiment. In this example, an AMF connected to a gNB is used as an example of a core network element for description. The method is applied to the mobile network shown in FIG. 1A. As shown in FIG. 4, the communication method includes the following steps.

S401: An eNB sends a first interface setup request message to the gNB, where the first interface setup request message includes cell information of the eNB.

The first interface setup request message is an EN-DC X2 interface setup request message, or is another message. This is not limited herein.

The cell information includes at least one of the following: a physical cell identifier or a tracking area identifier.

S402: The gNB sends a first interface setup response message to the eNB, where the first interface setup response message includes broadcast information of a serving cell of the gNB.

In response to the first interface setup request message, the gNB sends the first interface setup response message to the eNB.

The first interface setup response message is an EN-DC X2 interface setup response message.

The broadcast information of the serving cell of the gNB includes at least one of the following: a SIB 1 or a SIB 2.

In at least one embodiment, step S401 and step S402 is performed in response to the gNB being connected to the AMF, or step S401 and step S402 is performed when the gNB is not connected to the AMF.

S403: The gNB sends a second interface setup request message to the AMF, where the second interface setup request message includes cell information of the gNB and the cell information of the eNB.

The second interface setup request message is an NG interface setup request message.

After obtaining the cell information of the gNB and the cell information of the eNB, the AMF determines that a tracking area indicated by a tracking area identifier of the serving cell of the gNB and a tracking area indicated by a tracking area identifier of the serving cell of the eNB are registration areas of a terminal device. Certainly, the registration area alternatively is a cell indicated by cell identification information, or the like. In this case, the terminal device in an idle state does not trigger a TAU procedure or an RAU procedure in response to moving between the serving cell of the eNB and the serving cell of the gNB. This reduces energy consumption of the terminal device, and reduce network signaling.

S404: The AMF sends a second interface setup response message to the gNB.

In response to the second interface setup request message, the AMF sends the second interface setup response message to the gNB.

S405: The AMF determines the registration area of the terminal device, where the registration area includes at least one tracking area.

S406: The AMF sends a paging message to the gNB, where the paging message includes a tracking area identifier corresponding to the at least one tracking area.

S407: The gNB sends the paging message to the eNB based on the tracking area identifier.

S408: The eNB sends the paging message in the tracking area indicated by the tracking area identifier.

S409: The terminal device sends a first message to the eNB, where the first message is for requesting to access the eNB.

S410: The eNB sends a second message to the terminal device, where the second message includes a system message corresponding to at least one serving cell of the gNB.

S411: The terminal device performs cell handover or redirection.

In at least one embodiment, for step S405 to step S410, refer to step S301 to step S307. Details are not described herein again.

Figure 5:
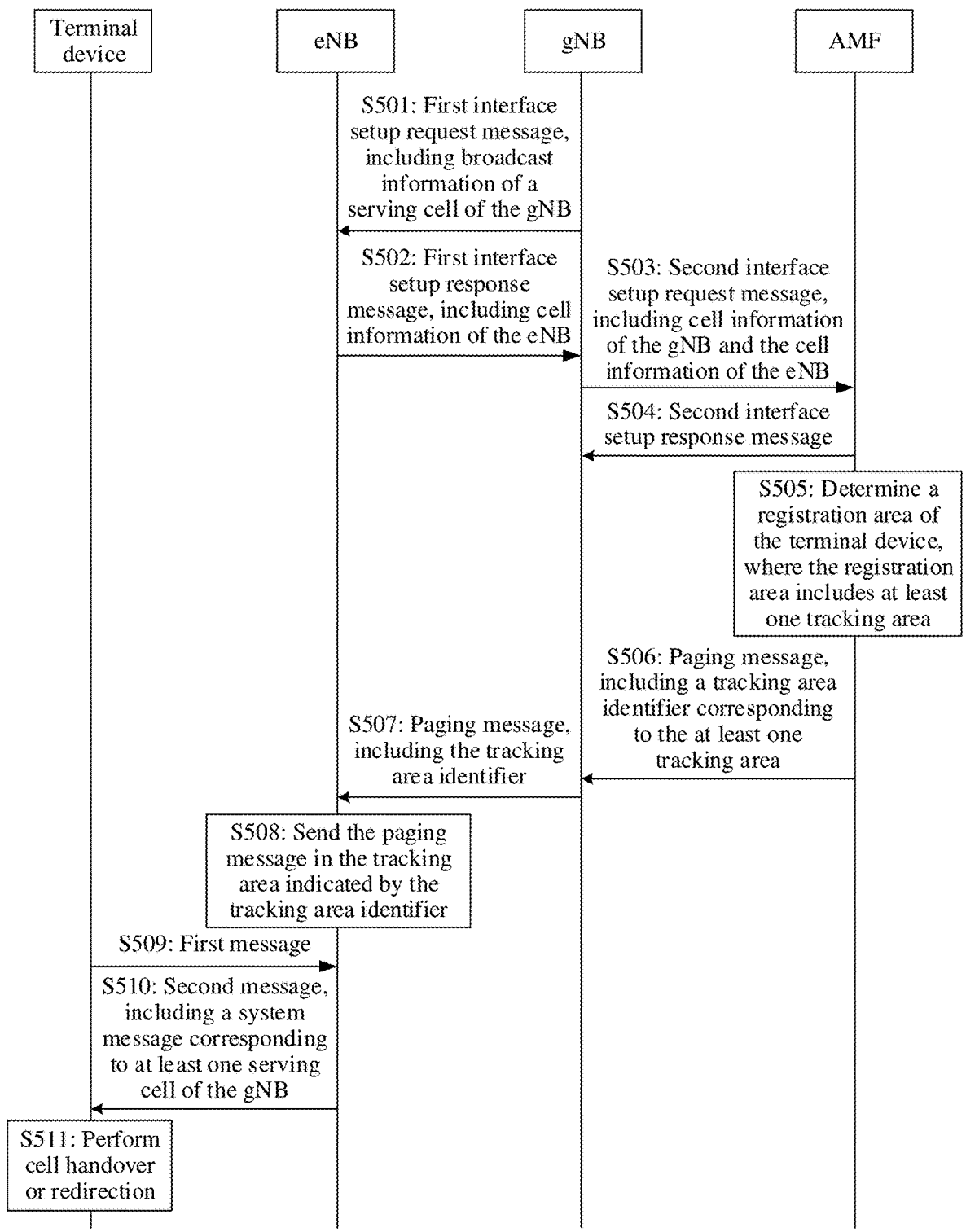
FIG. 5 is a schematic interaction diagram of another communication method according to at least one embodiment.

FIG. 5 is a schematic interaction diagram of another communication method according to at least one embodiment. In this example, an AMF connected to a gNB is used as an example of a core network element for description. The method is applied to the mobile network shown in FIG. 1A. As shown in FIG. 5, the communication method includes the following steps.

S501: The gNB sends a first interface setup request message to an eNB, where the first interface setup request message includes broadcast information of a serving cell of the gNB.

The first interface setup request message is an EN-DC X2 interface setup request message, or is another message. This is not limited herein.

The broadcast information of the serving cell of the gNB includes at least one of the following: a SIB 1 or a SIB 2.

S502: The eNB sends a first interface setup response message to the gNB, where the first interface setup response message includes cell information of the eNB.

The first interface setup response message is an EN-DC X2 interface setup response message.

The cell information includes at least one of the following: a physical cell identifier or a tracking area identifier.

In at least one embodiment, step S501 and step S502 is performed in response to the gNB being connected to the AMF, or step S501 and step S502 is performed in response to the gNB not being connected to the AMF.

S503: The gNB sends a second interface setup request message to the AMF, where the second interface setup request message includes cell information of the gNB and the cell information of the eNB.

S504: The AMF sends a second interface setup response message to the gNB.

S505: The AMF determines a registration area of a terminal device, where the registration area includes at least one tracking area.

S506: The AMF sends a paging message to the gNB, where the paging message includes a tracking area identifier corresponding to the at least one tracking area.

S507: The gNB sends the paging message to the eNB based on the tracking area identifier.

S508: The eNB sends the paging message in the tracking area indicated by the tracking area identifier.

S509: The terminal device sends a first message to the eNB, where the first message is for requesting to access the eNB.

S510: The eNB sends a second message to the terminal device, where the second message includes a system message corresponding to at least one serving cell of the gNB.

S511: The terminal device performs cell handover or redirection.

In at least one embodiment, for step S503 to step S511, refer to step S403 to step S411. Details are not described herein again.

Figure 6:
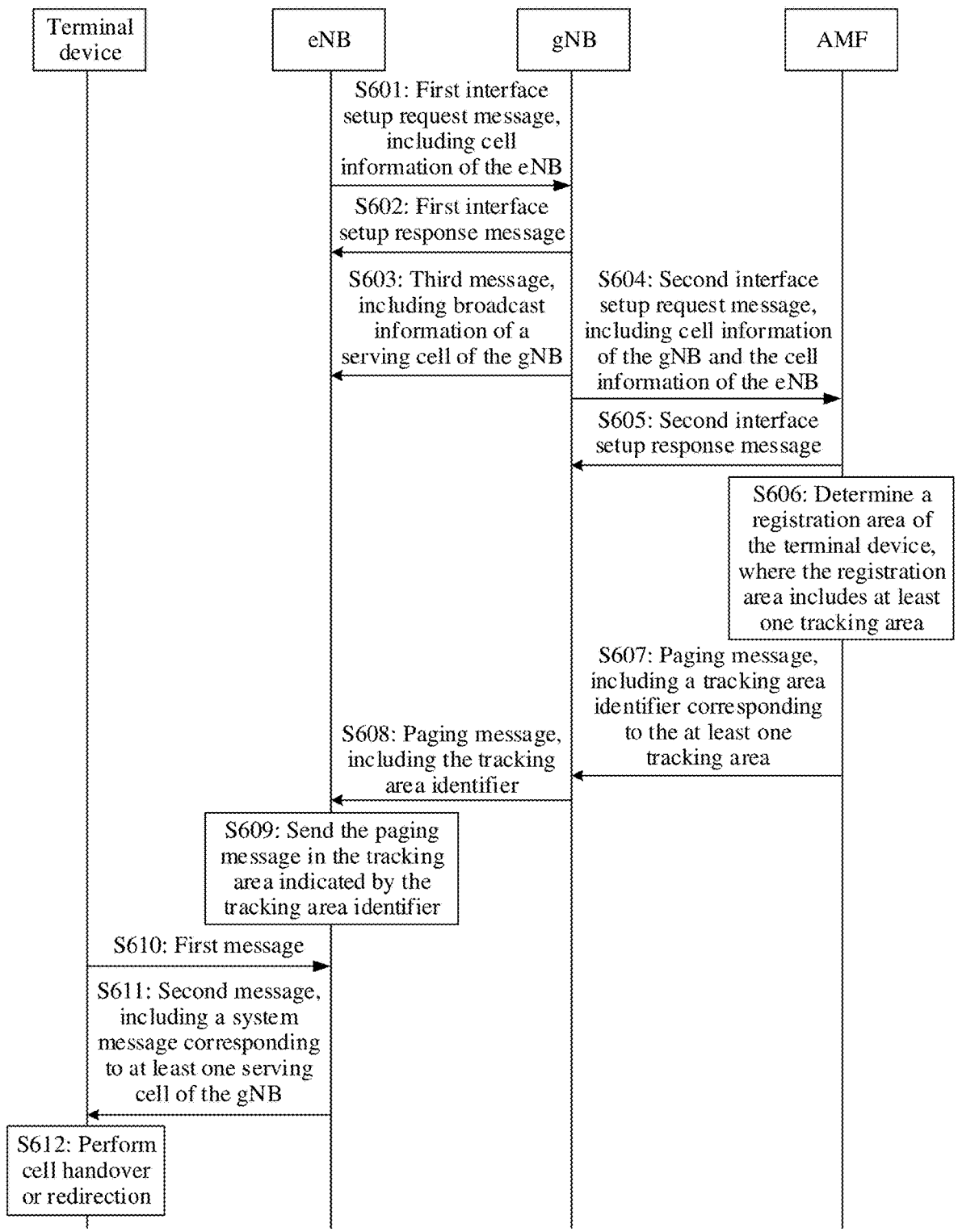
FIG. 6 is a schematic interaction diagram of another communication method according to at least one embodiment.

FIG. 6 is a schematic interaction diagram of another communication method according to at least one embodiment. In this example, an AMF connected to a gNB is used as an example of a core network element for description. The method is applied to the mobile network shown in FIG. 1A. As shown in FIG. 6, the communication method includes the following steps.

S601: An eNB sends a first interface setup request message to the gNB, where the first interface setup request message includes cell information of the eNB.

S602: The gNB sends a first interface setup response message to the eNB, where the first interface setup response message includes broadcast information of a serving cell of the gNB.

The process of setting up a first interface alternatively is initiated by the gNB. For a specific method, refer to step S501 and step S502.

S603: The gNB sends a third message to the eNB, where the third message includes the broadcast information of the serving cell of the gNB.

The third message is a message different from the first interface setup response message. For example, the third message is another existing message, or is a newly constructed message. The broadcast information of the serving cell of the gNB is sent by using the newly constructed message without changing an existing interface setup solution, so that system reliability is improved. There is no time sequence between sending of the third message and receiving of the first interface setup request message.

S604: The gNB sends a second interface setup request message to the AMF, where the second interface setup request message includes cell information of the gNB and the cell information of the eNB.

S605: The AMF sends a second interface setup response message to the gNB.

S606: The AMF determines a registration area of a terminal device, where the registration area includes at least one tracking area.

S607: The AMF sends a paging message to the gNB, where the paging message includes a tracking area identifier corresponding to the at least one tracking area.

S608: The gNB sends the paging message to the eNB based on the tracking area identifier.

S609: The eNB sends the paging message in the tracking area indicated by the tracking area identifier.

S610: The terminal device sends a first message to the eNB, where the first message is for requesting to access the eNB.

S611: The eNB sends a second message to the terminal device, where the second message includes a system message corresponding to at least one serving cell of the gNB.

S612: The terminal device performs cell handover or redirection.

In at least one embodiment, for steps S601 and S602, refer to steps S401 and S402. For specific implementations of steps S604 to S612, refer to specific implementations of steps S403 to S411. Details are not described herein again.

Figure 7:
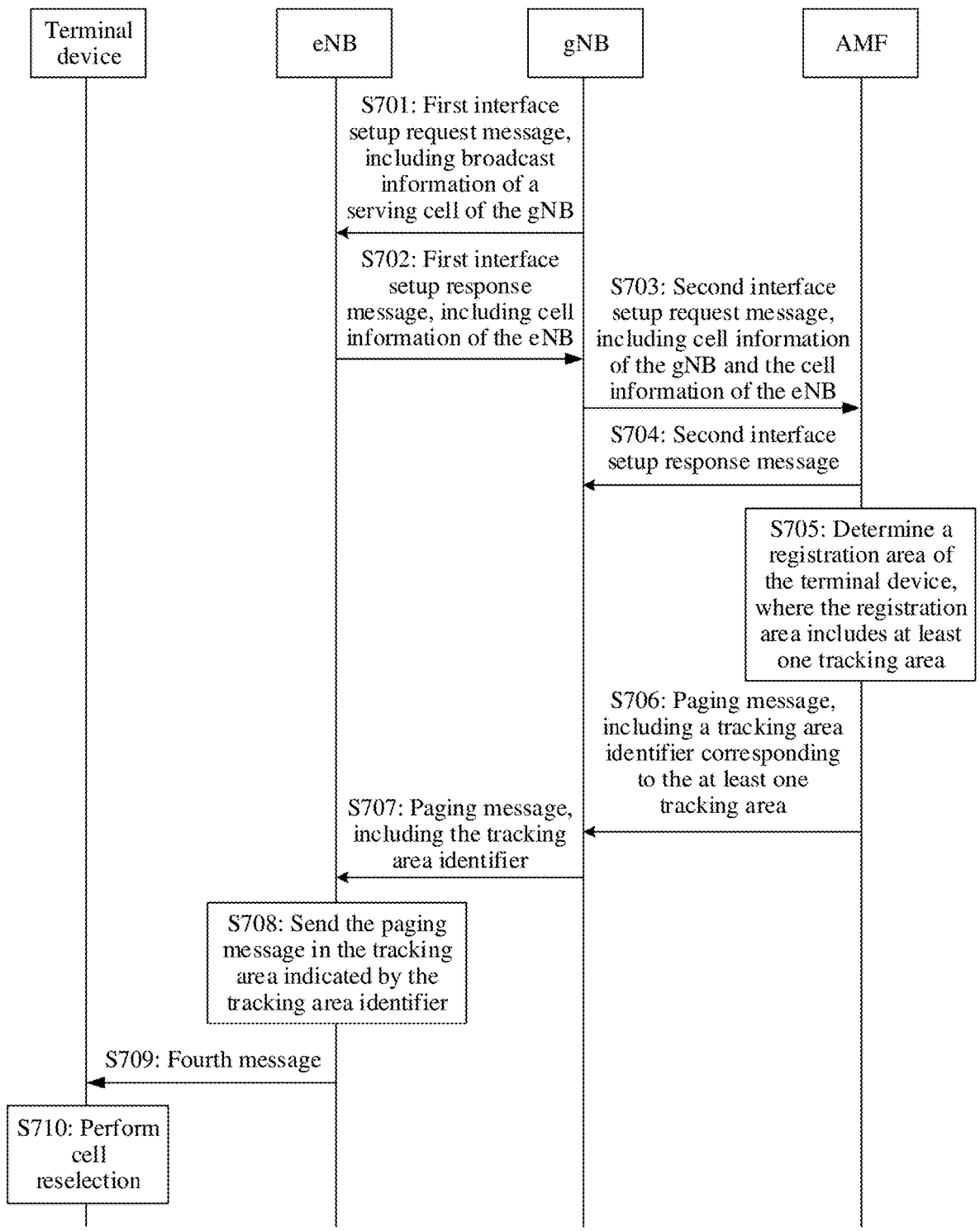
FIG. 7 is a schematic interaction diagram of another communication method according to at least one embodiment.

FIG. 7 is a schematic interaction diagram of another communication method according to at least one embodiment. In this example, an AMF connected to a gNB is used as an example of a core network element for description. The method is applied to the mobile network shown in FIG. 1B. As shown in FIG. 7, the communication method includes the following steps.

S701: The gNB sends a first interface setup request message to an eNB, where the first interface setup request message includes broadcast information of a serving cell of the gNB.

The first interface setup request message is an EN-DC X2 interface setup request message.

The broadcast information of the serving cell of the gNB includes at least one of the following: a SIB 1 or a SIB 2.

S702: The eNB sends a first interface setup response message to the gNB, where the first interface setup response message includes cell information of the eNB.

The first interface setup response message is an EN-DC X2 interface setup response message.

The cell information includes at least one of the following: a physical cell identifier or a tracking area identifier.

In this embodiment of this application, step S701 and step S702 is performed in response to the gNB being connected to the AMF, or step S701 and step S702 is performed when the gNB is not connected to the AMF.

S703: The gNB sends a second interface setup request message to the AMF, where the second interface setup request message includes cell information of the gNB and the cell information of the eNB.

S704: The AMF sends a second interface setup response message to the gNB.

S705: The AMF determines a registration area of a terminal device, where the registration area includes at least one tracking area.

S706: The AMF sends a paging message to the gNB, where the paging message includes a tracking area identifier corresponding to the at least one tracking area.

S707: The gNB sends the paging message to the eNB based on the tracking area identifier.

S708: The eNB sends the paging message in the tracking area indicated by the tracking area identifier.

S709: The eNB sends a fourth message.

The eNB sends the fourth message in the tracking area indicated by the tracking area identifier. The eNB sends the fourth message in response to a measurement value of a downlink RSRP being higher than a preset threshold. The preset threshold is set based on an empirical value or historical data. The fourth message is a broadcast message.

S710: The terminal device performs cell reselection.

The terminal device receives the fourth message, and in response to the fourth message, the terminal device performs cell reselection.

When the terminal device performs cell reselection, a reselected cell is one of at least one serving cell of the gNB.

In at least one embodiment, for steps S701 and S702, refer to specific implementations of steps S401 and S402. For specific implementations of steps S703 to S708, refer to specific implementations of steps S403 to S408. Details are not described herein again.

In this example, in response to determining that the measurement value of the downlink RSRP being higher than the preset threshold, the eNB sends, to the terminal device, the fourth message (for example, the broadcast message), indicating the terminal device to perform cell reselection. This increases a rate at which the terminal device accesses the serving cell of the gNB.

Figure 8:
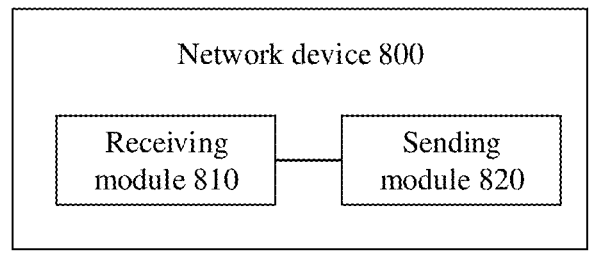
FIG. 8 is a schematic block diagram of a network device according to at least one embodiment.

FIG. 8 is a schematic block diagram of a network device according to at least one embodiment. The network device 800 includes a receiving module 810 and a sending module 820.

The receiving module 810 is configured to receive a first message sent by a terminal device, where the first message is for requesting to access the network device.

The sending module 820 is configured to send a second message to the terminal device, where the second message includes a system message corresponding to at least one serving cell of a gNB, and the second message indicates the terminal device to be redirected to one of the at least one serving cell of the gNB, or the second message indicates the terminal device to be handed over to one of the at least one serving cell of the gNB.

In at least one embodiment, the second message further includes a condition for redirecting the terminal device to a cell of the at least one serving cell of the gNB, to indicate the terminal device to perform cell redirection or cell handover under a corresponding condition. A redirection or handover condition includes that the terminal device receives a downlink common control message sent by a target cell, and strength of a downlink signal of the target cell received by the terminal device is higher than a threshold. The downlink common control message includes an SSB.

In at least one embodiment,
the receiving module 810 is configured to receive a paging message from the gNB, where the paging message includes a tracking area identifier; and
the sending module 820 is configured to send the paging message in a tracking area indicated by the tracking area identifier.

In at least one embodiment,
the sending module 820 is configured to send a first interface setup request message to the gNB, where the first interface setup request message includes cell information of the network device; and
the receiving module 810 is configured to receive a first interface setup response message sent by the gNB, where the first interface setup response message includes broadcast information of the serving cell of the gNB.

In at least one embodiment,
the sending module 820 is configured to send a first interface setup request message to the gNB, where the first interface setup request message includes cell information of the network device; and
the receiving module 810 is configured to receive a first interface setup response message sent by the gNB.

In at least one embodiment,
the receiving module 810 is configured to receive a third message sent by the gNB, where the third message includes the broadcast information of the serving cell of the gNB.

In at least one embodiment, the cell information includes at least one of the following: a physical cell identifier or the tracking area identifier.

In at least one embodiment, the broadcast information of the serving cell of the gNB includes at least one of the following: a SIB 1 or a SIB 2.

In at least one embodiment, the first message further includes measurement information of the at least one serving cell of the gNB,
the system message corresponding to the at least one serving cell of the gNB includes identification information of a target cell and a system message corresponding to the target cell, and the target cell is a serving cell to which the terminal device is handed over.

In at least one embodiment, the sending module 820 is configured to send a frequency for redirection to the terminal device, where the frequency is a frequency of the at least one serving cell of the gNB.

In at least one embodiment, the sending module 820 is configured to send a notification message to a neighboring gNB in response to the second message not including the system message corresponding to the at least one serving cell of the gNB, where the notification message indicates at least one serving cell of the neighboring gNB to perform RMSI broadcast.

In at least one embodiment, the sending module 820 is configured to send a fourth message to the terminal device, where the fourth message indicates the terminal device to perform cell reselection.

Figure 9:
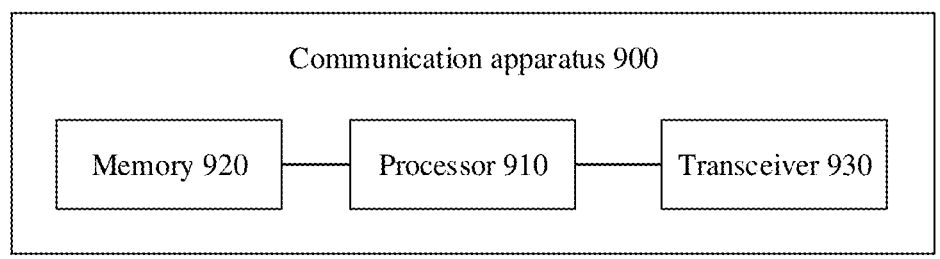
FIG. 9 is a schematic block diagram of a communication apparatus according to at least one embodiment.

As shown in FIG. 9, at least one embodiment further provides a communication apparatus 900. The communication apparatus 900 includes a processor 910, a memory 920, and a transceiver 930. The memory 920 stores instructions or a program. The processor 910 is configured to execute the instructions or the program stored in the memory 920. In response to the instructions or the program stored in the memory 920 being executed, the transceiver 930 is configured to perform the operation performed by the receiving module 810 or the sending module 820 in the foregoing embodiment.

The network device 800 or the communication apparatus 900 in at least one embodiment corresponds to the eNB in the communication method. In addition, operations and/or functions of the modules in the network device 800 or the communication apparatus 900 are respectively used to implement corresponding procedures of the methods in FIG. 2 to FIG. 7. For brevity, details are not described herein again.

Figure 10:
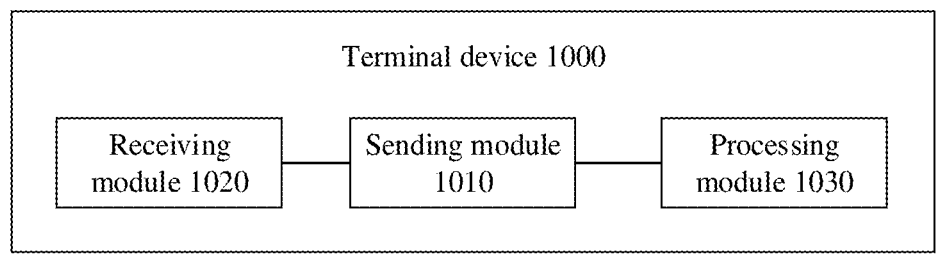
FIG. 10 is a schematic block diagram of a terminal device according to at least one embodiment.

FIG. 10 is a schematic block diagram of a terminal device according to at least one embodiment. The terminal device 1000 includes a sending module 1010 and a receiving module 1020.

The sending module 1010 is configured to send a first message to an eNB, where the first message is for requesting to access the eNB.

The receiving module 1020 is configured to receive a second message sent by the eNB, where the second message includes a system message corresponding to at least one serving cell of a gNB, and the second message indicates the terminal device to be redirected to one of the at least one serving cell of the gNB, or the second message indicates the terminal device to be handed over to one of the at least one serving cell of the gNB.

In at least one embodiment, the first message further includes measurement information of the at least one serving cell of the gNB, the system message corresponding to the at least one serving cell of the gNB includes identification information of a target cell and a system message corresponding to the target cell, and the target cell is a cell to which the terminal device is to be handed over.

In at least one embodiment, the device further includes a processing module 1030.

The processing module 1030 is configured to determine a target cell from the at least one serving cell of the gNB, where the target cell is a serving cell to which the terminal device is handed over.

The processing module 1030 is configured to hand over the terminal device to the target cell based on a system message corresponding to the target cell.

In at least one embodiment,
the receiving module 1020 is configured to receive information about a registration area sent by a core network element, where the information about the registration area includes a tracking area identifier of the serving cell of the gNB and a tracking area identifier of a serving cell of the eNB.

In at least one embodiment, the receiving module 1020 is configured to receive a fourth message sent by the eNB; and the processing module 1030 is configured to perform cell reselection based on the fourth message.

Figure 11:
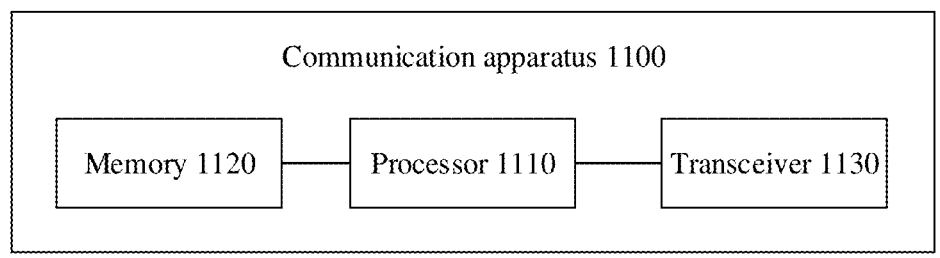
FIG. 11 is a schematic block diagram of a communication apparatus according to at least one embodiment.

As shown in FIG. 11, an embodiment of this application further provides a communication apparatus 1100. The communication apparatus 1100 includes a processor 1110, a memory 1120, and a transceiver 1130. The memory 1120 stores instructions or a program. The processor 1110 is configured to execute the instructions or the program stored in the memory 1120. In response to the instructions or the program stored in the memory 1120 being executed, the processor 1110 is configured to perform the operation performed by the processing module 1030 in the foregoing embodiment, and the transceiver 1130 is configured to perform the operation performed by the receiving module 1020 or the sending module 1010 in the foregoing embodiment.

The terminal device 1000 or the communication apparatus 1100 in embodiments of this application corresponds to the terminal device in the communication method in embodiments of this application. In addition, operations and/or functions of the modules in the terminal device 1000 or the communication apparatus 1100 are respectively used to implement corresponding procedures of the methods in FIG. 2 to FIG. 7. For brevity, details are not described herein again.

Figure 12:
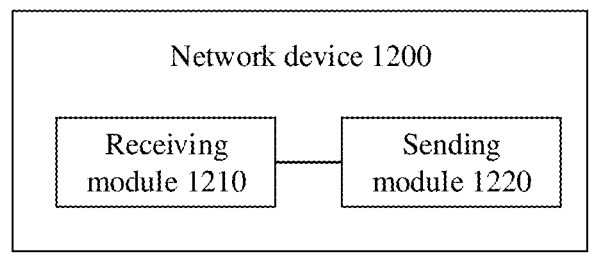
FIG. 12 is a schematic block diagram of a network device according to at least one embodiment.

FIG. 12 is a schematic block diagram of a network device according to at least one embodiment. The network device 1200 includes a receiving module 1210 and a sending module 1220.

The receiving module 1210 is configured to receive a paging message sent by a core network element, where the paging message includes a tracking area identifier corresponding to at least one tracking area.

The sending module 1220 is configured to send the paging message to an eNB based on the tracking area identifier.

In at least one embodiment, the receiving module 1210 is configured to receive a first interface setup request message sent by the eNB, where the first interface setup request message includes cell information of the eNB; and the sending module 1220 is configured to send a first interface setup response message to the eNB, where the first interface setup response message includes broadcast information of a serving cell of the network device.

In at least one embodiment, the receiving module 1210 is configured to receive a first interface setup request message sent by the eNB, where the first interface setup request message includes cell information of the eNB; and the sending module 1220 is configured to send a first interface setup response message to the eNB.

In at least one embodiment, the sending module 1220 is configured to send a third message to the eNB, where the third message includes broadcast information of a serving cell of the network device.

In at least one embodiment, the cell information includes at least one of the following: information about a physical cell identifier or information about the tracking area identifier.

In at least one embodiment, the broadcast information of the serving cell of the network device includes at least one of the following: a SIB 1 or a SIB 2.

In at least one embodiment, the sending module 1220 is configured to send a second interface setup request message to the core network element, where the second interface setup request message includes cell information of the network device and the cell information of the eNB; and the receiving module 1210 is configured to receive a second interface setup response message sent by the core network element.

Figure 13:
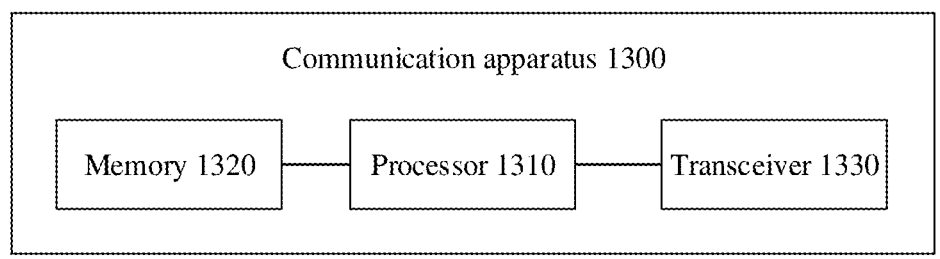
FIG. 13 is a schematic block diagram of a communication apparatus according to at least one embodiment.

As shown in FIG. 13, at least one embodiment further provides a communication apparatus 1300. The communication apparatus 1300 includes a processor 1310, a memory 1320, and a transceiver 1330. The memory 1320 stores instructions or a program. The processor 1310 is configured to execute the instructions or the program stored in the memory 1320. In response to the instructions or the program stored in the memory 1320 is executed, the transceiver 1330 is configured to perform the operation performed by the receiving module 1210 or the sending module 1220 in the foregoing embodiment.

The network device 1200 or the communication apparatus 1300 in embodiments of this application corresponds to the gNB in the communication method in embodiments of this application. In addition, operations and/or functions of the modules in the network device 1200 or the communication apparatus 1300 are respectively used to implement corresponding procedures of the methods in FIG. 2 to FIG. 7. For brevity, details are not described herein again.

Figure 14:
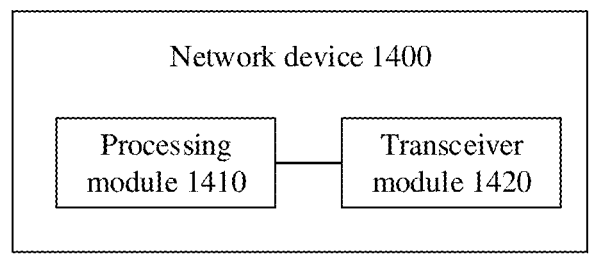
FIG. 14 is a schematic block diagram of a network device according to at least one embodiment.

FIG. 14 is a schematic block diagram of a network device according to at least one embodiment. The network device 1400 includes a processing module 1410 and a transceiver module 1420.

The processing module 1410 is configured to determine a registration area of a terminal device, where the registration area includes at least one tracking area.

The transceiver module 1420 is configured to send a paging message to a gNB, where the paging message includes a tracking area identifier corresponding to the at least one tracking area.

In at least one embodiment, the transceiver module 1420 is configured to receive a second interface setup request message sent by the gNB, where the second interface setup request message includes cell information of the gNB and cell information of an eNB; and the transceiver module 1420 is configured to send a second interface setup response message to the gNB.

In at least one embodiment, the cell information includes at least one of the following: information about a physical cell identifier or information about the tracking area identifier.

In at least one embodiment, the transceiver module 1420 is configured to send information about the registration area to the terminal device, where the information about the registration area includes the tracking area identifier corresponding to the at least one tracking area, and the tracking area identifier corresponding to the at least one tracking area includes a tracking area identifier of a serving cell of the gNB and a tracking area identifier of a serving cell of the eNB.

Figure 15:
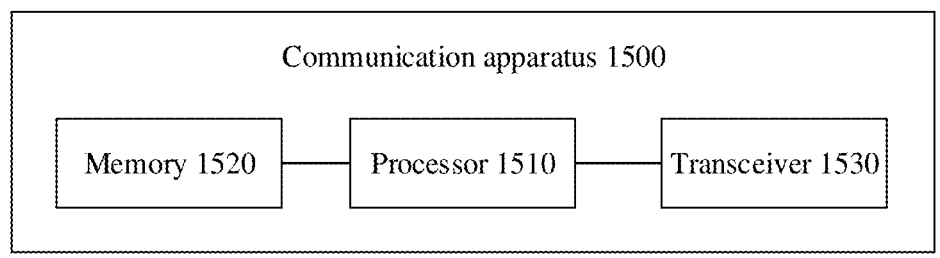
FIG. 15 is a schematic block diagram of a communication apparatus according to at least one embodiment.

As shown in FIG. 15, an embodiment of this application further provides a communication apparatus 1500. The communication apparatus 1500 includes a processor 1510, a memory 1520, and a transceiver 1530. The memory 1520 stores instructions or a program. The processor 1510 is configured to execute the instructions or the program stored in the memory 1520. In response to the instructions or the program stored in the memory 1520 is executed, the processor 1510 is configured to perform the operation performed by the processing module 1410 in the foregoing embodiment, and the transceiver 1530 is configured to perform the operation performed by the transceiver module 1420 in the foregoing embodiment.

The network device 1400 or the communication apparatus 1500 in embodiments of this application corresponds to the core network element in the communication method in embodiments of this application. In addition, operations and/or functions of the modules in the network device 1400 or the communication apparatus 1500 are respectively used to implement corresponding procedures of the methods in FIG. 2 to FIG. 7. For brevity, details are not described herein again.

At least one embodiment provides a communication system. The communication system includes the network device in FIG. 8, the terminal device in FIG. 10, the network device in FIG. 12, and the network device in FIG. 14.

Figure 16:
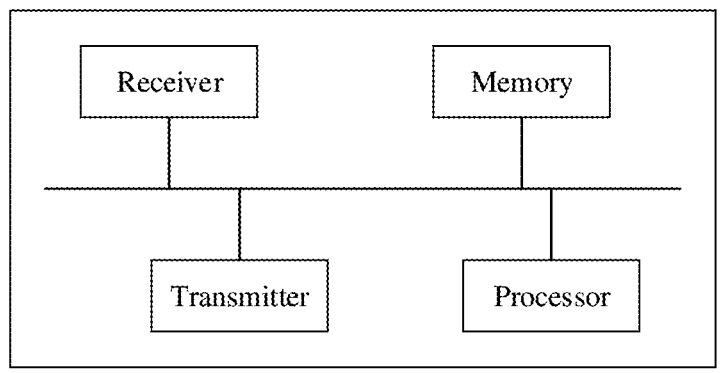
FIG. 16 is a schematic diagram of a hardware structure of a communication apparatus according to at least one embodiment.

FIG. 16 is a schematic diagram of a hardware structure of a communication apparatus according to at least one embodiment. The communication apparatus includes a processor, and further includes a receiver, a transmitter, and a memory. The receiver, the transmitter, the memory, and the processor are connected using a bus.

The memory includes but is not limited to a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory is configured to store related instructions and data.

The receiver is configured to receive data and/or a signal, and the transmitter is configured to send data and/or a signal. The transmitter and the receiver is independent components, or is an integral component.

The processor includes one or more processors, for example, includes one or more central processing units (central processing units, CPUs). In response to the processor being one CPU, the CPU is a single-core CPU or a multi-core CPU.

The memory is configured to store program code and data of a network device.

The processor is configured to invoke the program code and the data in the memory, to perform the steps in the foregoing method embodiments. For details, refer to the descriptions in the foregoing method embodiment. Details are not described herein again.

FIG. 16 shows a simplified design of the communication apparatus. The communication apparatus further includes other elements, including but not limited to any quantity of transceivers, processors, controllers, memories, and the like, and communication apparatuses that implement at least one embodiment fall within the protection scope described herein.

The communication apparatus in FIG. 16 corresponds to the gNB, the eNB, the terminal device, or the core network element in the communication method in embodiments of this application. In addition, operations and/or functions of the modules in the communication apparatus are respectively used to implement corresponding procedures of the methods in FIG. 2 to FIG. 7. For brevity, details are not described herein again.

Figure 17:
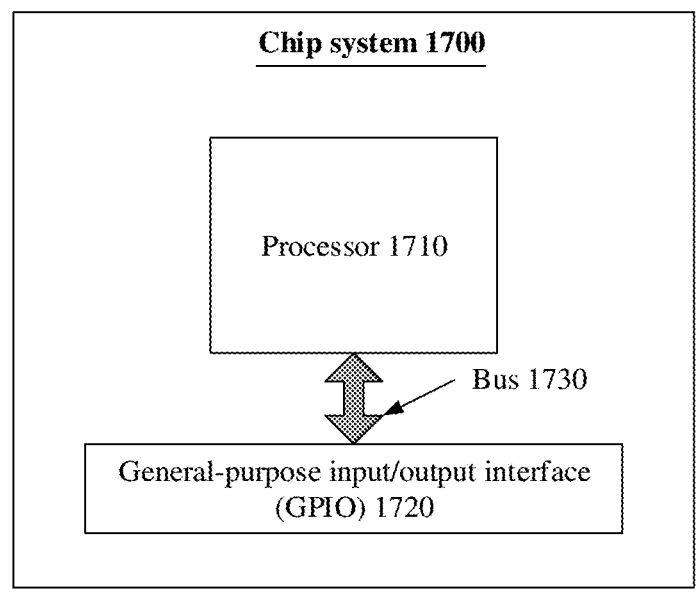
FIG. 17 is a schematic diagram of a structure of a chip system according to at least one embodiment.

FIG. 17 is a schematic diagram of a structure of a chip system according to at least one embodiment. As shown in FIG. 17, the chip system 1700 includes a processor 1710 and one or more interfaces 1720 coupled to the processor 1710. For example, the processor 1710 is configured to read and execute computer-readable instructions. During specific implementation, the processor 1710 includes a controller, an arithmetic unit, and a register. For example, the controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, and also performs an address operation and address translation. The register is mainly responsible for saving a quantity of register operations, intermediate operation results, and the like that are temporarily stored during instruction execution. During specific implementation, a hardware architecture of the processor 1710 is an application-specific integrated circuit (application-specific integrated circuit, ASIC) architecture, a microprocessor without interlocked piped stages (microprocessor without interlocked piped stages, MIPS) architecture, an advanced reduced instruction set computing machine (advanced RISC machine, ARM) architecture, an NP architecture, or the like. The processor 1710 is single-core or is multi-core.

For example, the interface 1720 is configured to input to-be-processed data to the processor 1710, and outputs a processing result of the processor 1710. During specific implementation, the interface 1720 is a general-purpose input/output (general-purpose input/output, GPIO) interface. The interface 1720 is connected to the processor 1710 through a bus 1730.

In at least one embodiment, the processor 1710 is configured to invoke, from a memory, a program or data for implementation on the network device side or the terminal device side in the communication method in one or more of embodiments of this application, so that the chip implements the methods shown in FIG. 2 to FIG. 7. The memory is integrated with the processor 1710, or is coupled to the communication chip 1700 through the interface 1720. In other words, the memory is a part of the communication chip 1700, or is independent of the communication chip 1700. The interface 1720 is configured to output an execution result of the processor 1710. In this application, the interface 1720 is specifically configured to output a decoding result of the processor 1710. For the communication method provided in one or more embodiments of this application, refer to the foregoing embodiments. Details are not described herein again.

Functions corresponding to the processor 1710 and the interface 1720 is implemented by using a hardware design, is implemented by using a software design, or is implemented by using a combination of software and hardware. This is not limited herein.

The memory mentioned in at least one embodiment is a volatile memory or a nonvolatile memory, or includes a volatile memory and a nonvolatile memory. The nonvolatile memory is a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory is a random access memory (Random Access Memory, RAM), used as an external cache. Through example but not limitative description, many forms of RAMs is used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

In response to the processor being a general-purpose processor, a DSP, an ASIC, an FPGA, another programmable logic device, a transistor logic device, or a discrete hardware component, the memory (a storage module) is integrated into the processor.

At least one embodiment further provides a computer storage medium. The computer storage medium stores a program, and in response to the program being executed, some or all of the steps of any communication method described in the foregoing method embodiment are performed.

For ease of description, the foregoing method embodiments are expressed as combinations of a series of actions. However, a person skilled in the art knows that at least one embodiment is not limited to the described action sequence, because some steps are performed in other sequences or performed simultaneously. In addition, a person skilled in the art also knows that embodiments described herein are provided as examples, and the related actions and modules are not used.

In the foregoing embodiments, descriptions of embodiments have respective focuses. For a part that is not described in detail in an embodiment, refer to related description in other embodiments.

In the several embodiments provided in this application, the apparatus is implemented in other manners. For example, the described apparatus is merely an example. For example, division into the units is merely logical function division and is other division in actual implementation. For example, a plurality of units or components is combined or integrated into another system, or some features is ignored or not performed. In addition, the displayed or discussed mutual couplings or direct couplings or communication connections is implemented through some interfaces. The indirect couplings or communication connections between the apparatuses or units is implemented in electronic, mechanical, or other forms.

The units described as separate parts may or may not be physically separate, and parts displayed as units may or may not be physical units, is located in one position, or is distributed on a plurality of network units. Some or all of the units is selected based on achieve the objectives of the solutions of at least one embodiment.

In addition, functional units in at least one embodiment are integrated into one processing unit, or the units exist alone physically, or two or more units are integrated into one unit. The integrated unit is implemented in a form of hardware, or is implemented in a form of a software functional unit.

When the integrated unit is implemented in the form of a software functional unit and sold or used as an independent product, the integrated unit is stored in a computer-readable memory. Based on such an understanding, the technical solutions of at least one embodiment, or the part contributing to technology in at least one embodiment, or the technical solutions in at least one embodiment are implemented in the form of a software product. The computer software product is stored in a memory and includes several instructions for instructing a computer device (which is a personal computer, a server, or a network device) to perform all or some of the steps of the methods. The foregoing memory includes any medium that stores program code, for example, a USB flash drive, a read-only memory (ROM, Read-Only Memory), a random access memory (RAM, Random Access Memory), a removable hard disk, a magnetic disk, or an optical disc.

A person of ordinary skill in the art understands that the steps of the methods in at least one embodiment are implemented by a program instructing related hardware. The program is stored in a computer-readable memory. The memory includes a flash memory, a read-only memory (English: Read-Only Memory, ROM for short), a random access memory (English: Random Access Memory, RAM for short), a magnetic disk, an optical disc, or the like.

What is claimed is:

1. A communication method, wherein the method comprises:
    sending, by a terminal device, a first message to an evolved NodeB (eNB),
        wherein the first message is for requesting to access the eNB;
    receiving, by the terminal device, a second message from the eNB,
        wherein the second message includes a system message corresponding to at least one serving cell of a gNB, and the second message indicates the terminal device to be redirected to the at least one serving cell of the gNB; and
    receiving a frequency for redirection for the terminal device,
        wherein the frequency is used by the at least one serving cell of the gNB; and the eNB sends a frequency for redirection to the terminal device, where the frequency is a frequency of the at least one serving cell of the gNB, and indicates the terminal device to be redirected to one of the at least one serving cell of the gNB based on the frequency for redirection.

2. The method according to claim 1, wherein the first message further includes measurement information of the at least one serving cell of the gNB, the system message corresponding to the at least one serving cell of the gNB includes identification information of a target cell and a system message corresponding to the target cell, and the target cell is one of the at least one serving cell of the gNB to which the terminal device is handed over.

3. The method according to claim 1, wherein the method further comprises:
    determining, by the terminal device, a target cell from the at least one serving cell of the gNB; and
    handing over, by the terminal device, to the target cell based on the system message corresponding to the target cell.

4. The method according to claim 1, wherein the method further comprises:
    receiving, by the terminal device, information about a registration area from a core network element, wherein the information about the registration area includes a tracking area identifier of the at least one serving cell of the gNB and a tracking area identifier of a serving cell of the eNB.

5. The method according to claim 1, wherein the method further comprises:
    receiving, by the terminal device, a third message from the eNB; and
    performing, by the terminal device, cell reselection based on the third message.

6. An apparatus, comprising:
a processor; and
a non-transitory computer-readable medium including computer-executable instructions that, in response to being executed by the processor, cause the processor to carry out a method including:
sending a first message to an evolved NodeB (eNB), wherein the first message is for requesting to access the eNB; receiving a second message from the eNB, wherein the second message includes a system message corresponding to at least one serving cell of a gNB, and the second message indicates the processor to be redirected to one of the at least one serving cell of the gNB; and
receiving a frequency for redirection for the terminal device, wherein the frequency is used by the at least one serving cell of the gNB.

7. The apparatus according to claim 6, wherein the first message further includes measurement information of the at least one serving cell of the gNB, the system message corresponding to the at least one serving cell of the gNB includes identification information of a target cell and a system message corresponding to the target cell, and the target cell is one of the at least one serving cell of the gNB to which the processor is handed over.

8. The apparatus according to claim 6, wherein the processor is further configured to:
determine a target cell from the at least one serving cell of the gNB; and
hand over to the target cell based on a system message corresponding to the target cell.

9. The apparatus according to claim 6, wherein the processor is further configured to:
receive information about a registration area from a core network element, wherein the information about the registration area includes a tracking area identifier of the at least one serving cell of the gNB and a tracking area identifier of a serving cell of the eNB.

10. The apparatus according to claim 6, wherein the processor is further configured to:
receive a third message from the eNB; and
perform cell reselection based on the third message.

11. An apparatus, comprising:
a processor; and
a non-transitory computer-readable medium including computer-executable instructions that, in response to being executed by the processor, cause the processor to carry out a method including:
receiving a first message received from a terminal device, wherein the first message is for requesting access;
sending a second message to the terminal device, wherein the second message includes a system message corresponding to at least one serving cell of a gNB, and the second message indicates the terminal device to be redirected to one of the at least one serving cell of the gNB, or the second message indicates the terminal device to be handed over to one of the at least one serving cell of the gNB;
sending a first interface setup request message to the gNB, wherein the first interface setup request message includes cell information of the eNB; and
receiving a first interface setup response message from the gNB, wherein the first interface setup response message includes broadcast information of the serving cell of the gNB.

12. The apparatus according to claim 11, wherein the processor is further configured to:
receive a paging message from the gNB, wherein the paging message includes a tracking area identifier; and
send the paging message in a tracking area indicated by the tracking area identifier.

13. The apparatus according to claim 11, wherein the first message further comprises measurement information of the at least one serving cell of the gNB,
the system message corresponding to the at least one serving cell of the gNB includes identification information of a target cell and a system message corresponding to the target cell, and the target cell is used for handing over the terminal device.

14. The apparatus according to claim 11, wherein the processor is further configured to:
send a frequency for redirection to the terminal device, wherein the frequency is used by the at least one serving cell of the gNB.

15. The apparatus according to claim 11, wherein the processor sends a notification message to a neighboring gNB in response to the second message not including the system message corresponding to the at least one serving cell of the gNB, wherein the notification message indicates at least one serving cell of the neighboring gNB to perform Remaining Minimum System Information (RMSI) broadcast.

16. The apparatus according to claim 11, wherein the processor is further configured to: send a third message to the terminal device, wherein the third message indicates the terminal device to perform cell reselection.

* * * * *